United States Patent
Seo

[11] Patent Number: 5,832,319
[45] Date of Patent: Nov. 3, 1998

[54] SYSTEM AND METHOD FOR DRIVING ELECTRONIC SHUTTER OF A CAMERA

[75] Inventor: Jae Kyeong Seo, Changwon-si, Rep. of Korea

[73] Assignee: Samsung Aerospace Industries, Ltd., Kyeongsangnam-do, Rep. of Korea

[21] Appl. No.: 836,989

[22] PCT Filed: Sep. 25, 1996

[86] PCT No.: PCT/KR96/00165

§ 371 Date: Aug. 6, 1997

§ 102(e) Date: Aug. 6, 1997

[87] PCT Pub. No.: WO97/13179

PCT Pub. Date: Apr. 10, 1997

[30] Foreign Application Priority Data

Oct. 4, 1995 [KR] Rep. of Korea ............... 95-33888
Jun. 18, 1996 [KR] Rep. of Korea ............... 96-16214
Jul. 16, 1996 [KR] Rep. of Korea ............... 96-28689

[51] Int. Cl.$^6$ .................. G03B 13/32; G03B 7/00
[52] U.S. Cl. ........................... 396/90; 396/220
[58] Field of Search ............... 396/90, 217, 220, 396/213, 449, 451, 462, 458, 497, 493, 132

[56] References Cited

U.S. PATENT DOCUMENTS

| 4,314,748 | 2/1982 | Kawabata et al. ............... 396/90 |
| 4,634,524 | 1/1987 | Huber . |
| 4,758,854 | 7/1988 | Saegusa . |
| 4,918,480 | 4/1990 | Hori . |
| 5,111,230 | 5/1992 | Kobayashi . |
| 5,162,834 | 11/1992 | Kichima ............... 396/90 |

FOREIGN PATENT DOCUMENTS

| 31 33 698 | 4/1982 | Germany . |
| 2 087 575 | 5/1982 | United Kingdom . |
| 2 280 275 | 1/1995 | United Kingdom . |

*Primary Examiner*—W. B. Perkey
*Attorney, Agent, or Firm*—Finnegan, Henderson, Farabow, Garrett & Dunner, L.L.P.

[57] ABSTRACT

As for a camera, a method for driving an electronic shutter of a camera, comprising the stages of setting an initial focus of a rotating member connected with a focus control lens in a state where the focus control lens is pre-set in a middle position between a maximum zoom position and a minimum zoom position, such that the initial position of a focus control lens is positioned in a middle step between a focus position of the focus control lens with respect to a pre-set farthest subject and a focus position of the focus control lens with respect to closest subject; controlling focus by rotating the rotating member connected to a first driving means from an initial position to a clockwise or counterclockwise direction, in order to move the focus control lens to a position set according to a value calculated by a distance measuring means when a shutter switch is operated; and performing exposure by sector opening/closing means being operated according to an exposure value calculated by a luminescent measuring means, connecting sectors, which are biased through an elastic member, with second driving means rotating in both directions, depending on the application of electrode, when controlling focus of the focus control lens is finished.

35 Claims, 26 Drawing Sheets

FIG. 25

CASE I NORMAL EXPOSURE, CLOCKWISE ROTATION OF RING, COUNTERCLOCKWISE ROTATION OF UPPER AND LOWER GEARS
[CONDITIONS] 1. UPPER AND LOWER BOSSES IN LEFT POSITION WHEN STARTING
2. NUMBER OF STEPS OF STEPPING MOTOR ARE ODD OR EVEN NUMBERS
3. EXAMPLE – EVEN + 4 STEPS, ODD + 7 STEPS

| DIVISION | | FOCUS SPHERE | EXPOSURE SPHERE | | INITIALIZING SPHERE | |
|---|---|---|---|---|---|---|
| | | MAGNET ON | | MAGNET ON → OPEN LEVER ROTATION → SECTOR OPEN → MAGNET OFF → CROSS LEVER ROTATION → SECTOR CLOSE | MAGNET OFF | |
| UPPER AND LOWER GEARS (232a) | BOSS EVEN | COUNTER-CLOCKWISE 4 STEPS DIRECT DRAGGING | RIGHT CLOCKWISE 1 STEP | LEFT COUNTER-CLOCKWISE 1 STEP | RIGHT CLOCKWISE 5 STEPS | LEFT COUNTER-CLOCKWISE 1 STEP |
| | BOSS ODD | COUNTER-CLOCKWISE 7 STEPS DIRECT DRAGGING | LEFT STOP | LEFT COUNTER-CLOCKWISE 1 STEP | RIGHT CLOCKWISE 9 STEPS | LEFT COUNTER-CLOCKWISE 1 STEP |
| FOCAL POINT CONTROL RING (218) | EVEN | CLOCKWISE 4 STEPS | CLOCKWISE 4 STEPS | +4 | 0 | 0 |
| | ODD | CLOCKWISE 7 STEPS | CLOCKWISE 7 STEPS | +8 | 0 | 0 |
| EXPOSURE CONTROL RING (228) | EVEN | CLOCKWISE 4 STEPS | CLOCKWISE 3 STEPS | +4 | −1 | 0 |
| | ODD | CLOCKWISE 7 STEPS | CLOCKWISE 7 STEPS | +8 | −1 | 0 |

CASE II NORMAL EXPOSURE, COUNTERCLOCKWISE ROTATION OF RING, CLOCKWISE ROTATION OF 3-4 GEARS
[CONDITIONS]
1. UPPER AND LOWER BOSSES IN LEFT POSITION WHEN STARTING
2. NUMBER OF STEPS OF STEPPING MOTOR ARE ODD OR EVEN NUMBERS
3. EXAMPLE – EVEN –4 STEPS, ODD +7 STEPS

| DIVISION | | FOCUS SPHERE (MAGNET ON) | EXPOSURE SPHERE (MAGNET ON) | (MAGNET ON) | INITIALIZING SPHERE (MAGNET OFF) |
|---|---|---|---|---|---|
| UPPER AND LOWER GEARS (232a) | BOSS EVEN | RIGHT — DRAGGING AFTER THE 1ST STEP CLOCKWISE –4 STEPS | LEFT — COUNTERCLOCKWISE 1 STEP | LEFT — COUNTERCLOCKWISE 1 STEP | LEFT — COUNTERCLOCKWISE 2 STEPS |
| | BOSS ODD | RIGHT — DRAGGING AFTER THE 1ST STEP CLOCKWISE –7 STEPS | RIGHT — STOP | LEFT — COUNTERCLOCKWISE 1 STEP | LEFT — COUNTERCLOCKWISE 6 STEPS |
| FOCAL POINT CONTROL RING (218) | EVEN | COUNTERCLOCKWISE –3 STEPS | COUNTERCLOCKWISE –3 STEPS | COUNTERCLOCKWISE –2 STEPS | 0 |
| | ODD | COUNTERCLOCKWISE –6 STEPS | COUNTERCLOCKWISE –6 STEPS | COUNTERCLOCKWISE –6 STEPS | 0 |
| EXPOSURE CONTROL RING (228) | EVEN | COUNTERCLOCKWISE –4 STEPS | COUNTERCLOCKWISE 3 STEPS | COUNTERCLOCKWISE –2 STEPS | 0 |
| | ODD | COUNTERCLOCKWISE –7 STEPS | COUNTERCLOCKWISE –7 STEPS | COUNTERCLOCKWISE –6 STEPS | 0 |

Exposure sphere sequence: OPEN LEVER ROTATION → SECTOR OPEN → MAGNET OFF → CLOSE LEVER ROTATION → SECTOR CLOSE

FIG. 26

CASE III BULB EXPOSURE, CLOCKWISE ROTATION OF RING, COUNTERCLOCKWISE ROTATION OF UPPER AND LOWER GEARS
[CONDITIONS] 1. UPPER AND LOWER BOSSES IN LEFT POSITION WHEN STARTING
2. NUMBER OF STEPS OF STEPPING MOTOR ARE ODD OR EVEN NUMBERS
3. EXAMPLE – EVEN + 4 STEPS, ODD + 7 STEPS

| | | | FOCUS SPHERE | | EXPOSURE SPHERE | | | | MAGNET ON | | INITIALIZING SPHERE | | MAGNET OFF |
|---|---|---|---|---|---|---|---|---|---|---|---|---|---|
| DIVISION | | BOSS | | | | | | | | | | | |
| UPPER AND LOWER GEARS (232a) | EVEN | BOSS | COUNTER-CLOCKWISE 4 STEPS DIRECT DRAGGING | LEFT | STOP | LEFT | MAGNET OFF → OPEN LEVER ROTATION → SECTOR OPEN → BULB TIME → MAGNET ON | COUNTER-CLOCKWISE 1 STEP | LEFT | COUNTER-CLOCKWISE 1 STEP | LEFT | CLOCKWISE 7 STEPS | RIGHT | COUNTER-CLOCKWISE 1 STEP | LEFT |
| | ODD | BOSS | COUNTER-CLOCKWISE 7 STEPS DIRECT DRAGGING | LEFT | CLOCKWISE 1 STEP | RIGHT | | COUNTER-CLOCKWISE 1 STEP | LEFT | MAGNET OFF → CLOSE LEVER ROTATION → SECTOR CLOSE | COUNTER-CLOCKWISE 1 STEP | LEFT | CLOCKWISE 9 STEPS | RIGHT | COUNTER-CLOCKWISE 1 STEP | LEFT |
| FOCAL POINT CONTROL RING (218) | EVEN | | CLOCKWISE 4 STEPS | | CLOCKWISE 4 STEPS | | | +5 | | +6 | | 0 | | 0 | |
| | ODD | | CLOCKWISE 7 STEPS | | CLOCKWISE 7 STEPS | | | +7 | | +8 | | 0 | | 0 | |
| EXPOSURE CONTROL RING (228) | EVEN | | CLOCKWISE 4 STEPS | | CLOCKWISE 4 STEPS | | | +5 | | +6 | | -1 | | 0 | |
| | ODD | | CLOCKWISE 7 STEPS | | CLOCKWISE 6 STEPS | | | +7 | | +8 | | -1 | | 0 | |

FIG. 27

CASE IV BULB EXPOSURE, COUNTERCLOCKWISE ROTATION OF RING
[CONDITIONS] 1. UPPER AND LOWER BOSSES IN LEFT POSITION WHEN STARTING
2. NUMBER OF STEPS OF STEPPING MOTOR ARE ODD OR EVEN NUMBERS
3. EXAMPLE – EVEN – 4 STEPS, ODD – 7 STEPS

| DIVISION | | FOCUS SPHERE | EXPOSURE SPHERE | | | | | INITIALIZING SPHERE | |
|---|---|---|---|---|---|---|---|---|---|
| | | MAGNET ON | | | | | MAGNET ON | | MAGNET OFF |
| UPPER AND LOWER GEARS (232a) | BOSS | DRAGGING RIGHT AFTER THE 1ST STEP CLOCKWISE -4 STEPS | RIGHT STOP | | MAGNET OFF → OPEN LEVER ROTATION → SECTOR OPEN → BULB TIME → MAGNET ON | LEFT COUNTER-CLOCKWISE 1 STEP | MAGNET OFF → CLOSE LEVER ROTATION → SECTOR CLOSE | LEFT COUNTER-CLOCKWISE 1 STEP | LEFT COUNTER-CLOCKWISE 2 STEPS |
| | EVEN | | | | | | | | |
| | BOSS | DRAGGING RIGHT AFTER THE 1ST STEP CLOCKWISE -7 STEPS | LEFT COUNTER-CLOCKWISE 1 STEP | | | LEFT COUNTER-CLOCKWISE 1 STEP | | LEFT COUNTER-CLOCKWISE 1 STEP | LEFT COUNTER-CLOCKWISE 4 STEPS |
| | ODD | | | | | | | | |
| FOCAL POINT CONTROL RING (218) | EVEN | COUNTER-CLOCKWISE -3 STEPS | COUNTER-CLOCKWISE -3 STEPS | | | -3 | | -2 | 0 |
| | ODD | COUNTER-CLOCKWISE -6 STEPS | COUNTER-CLOCKWISE -6 STEPS | | | -5 | | -4 | 0 |
| EXPOSURE CONTROL RING (228) | EVEN | COUNTER-CLOCKWISE -4 STEPS | COUNTER-CLOCKWISE -4 STEPS | | | -3 | | -2 | 0 |
| | ODD | COUNTER-CLOCKWISE -7 STEPS | COUNTER-CLOCKWISE -6 STEPS | | | -5 | | -4 | 0 |

FIG. 28

SYSTEM AND METHOD FOR DRIVING ELECTRONIC SHUTTER OF A CAMERA

BACKGROUND OF THE INVENTION

The present invention relates to a system and method for driving an electronic shutter of a camera, and more particularly, to a system and method for driving an electronic shutter of a camera in which electronic shutter responsiveness is quick and the structure of the electronic shutter is simple.

FIELD OF THE INVENTION

Generally, the electronic shutter of a camera is structured such that it automatically connects an automatic focus control, which controls the zooming of a lens for focus control to a measured distance of a subject, and an automatic exposure control, which matches and controls an iris and shutter speed according to an appropriate amount of exposure for the subject.

The above electronic shutter for cameras is proposed in U.S. Pat. Nos. 4,918,480, 4,634,524, and 5,111,230 and Japanese patent No. 61-9632.

The above prior art have in common a focus control ring, which controls the zooming in/out of the lens for focus control according to the measured distance of the subject, and a locking device, which stops the rotation of the focus control ring when the lens for focus control has reached the focus location.

Also included are sector open/close means, which open and close a sector according to a suitable amount of exposure for the subject; an exposure control ring, which operates the sector open/close means to its fixed location; an initial fixed position control device, which returns the focus control ring and exposure control ring to a fixed position immediately following exposure; and a power source which operates the focus control ring and the locking device.

In the prior art as in the above, with regard to the zoom control driving method of the lens for focus control, the focus control ring gradually moves the lens for focus control from a minimum zoom location to a maximum zoom location and vice versa.

In the above, the minimum zoom location indicates the focus location of the lens for focus control in which the subject is at the farthest distance, and the maximum zoom location refers to the focus location of the lens for focus control in which the subject is at the closest distance.

Referring to FIG. 29, a driving sequence of an electronic shutter of U.S. Pat. No. 5,111,230 is illustrated. As can be seen in the drawing, the lens for focus control is zoomed out from the minimum zoom location (j) to the maximum zoom location (k) by the focus control point. After the lens for focus control is zoomed out to the measured distance (l), it is returned in the opposite direction to the minimum zoom location (j).

Recently, in order to improve the focus control functions of the electronic shutter, focus control steps are used from the minimum zoom location to the maximum zoom location are further multiplied.

Resulting from this use of further multiplied steps is the increase in focus control time, slowing the responsiveness of the electronic shutter.

That is, if the first step of the focus control ring uses [X]ms amount of time, the time required to go from the beginning to the end (from the minimum zoom control location to the maximum zoom control location or vice versa) is the [maximum step No. X]ms amount of time, which uses an excessive amount of time for focus control.

Also, in the prior art electronic shutter, a locking device is needed for stopping the rotation of the focus control ring when the focus control lens is zoomed out according to the measured distance of the subject, resulting in a complicated structure.

SUMMARY OF THE INVENTION

The present invention has been made in an effort to solve the above problems.

It is an object of the present invention to provide an electronic shutter driving method and device for a camera which, by shortening the moving distance of a focus control lens, zooming the focus control lens out according to a measured distance of a subject, and therefore reducing the amount of time used for focus control, improves the responsiveness of an electronic shutter.

It is another object of the present invention to provide an electronic shutter driving method and device for a camera which, by eliminating the use of a locking device, employed for stopping the rotation of a focus ring when focus control is completed, attains a simpler structure and operational stability.

The above objects are realized in accordance with the present invention which provides an electronic shutter driving method in which an initial focus of a rotating member connected with a focus control lens is set in a state where the focus control lens is pre-set in a middle position between a maximum position and a minimum position of a whole focusing region. The initial position of a focus control lens is positioned in a middle step between a focus positions of the focus control lens with respect to a pre-set farthest subject and a focus position of the focus control lens with respect to closest subject. And then, focus is controlled by rotating the rotating member connected to a first driving means from an initial position to a clockwise or counterclockwise direction, in order to move the focus control lens to a position set according to a value calculated by a distance measuring circuit when a shutter switch is operated. Finally, exposure is performed by sector opening/closing means being operated according to an exposure value calculated by a luminescent measuring circuit, connecting sectors, which are biased through an elastic member, with second driving means rotating in both directions, depending on the application of current, when controlling focus of said focus control lens is finished.

According to another aspect of the present invention, a system for driving an electronic shutter of a camera comprises a first driving means including a power supply and a rotation member meshing with said driving means, rotating in the same direction as the power supply, and zooming the focus control lens in response to a value calculated by a distance measuring circuit. Means for detecting and adjusting the initial position adjusts said rotation member to an initial position when said rotation member is not positioned in a middle position between the maximum zooming position and the minimum zooming position, when initial power supply is applied to the camera. Second driving means, opening/closing sectors are driven according to an exposure value calculated by the luminescent measuring circuit when a power supply is applied, while keeping sectors closed, biased by the elastic member.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 25 is a view illustrating general exposure when an exposure control ring rotates clockwise for explaining an electronic shutter driving method according to a second preferred embodiment of the present invention;

FIG. 26 is a view illustrating general exposure when an exposure control ring rotates counterclockwise for explaining an electronic shutter driving method according to a second preferred embodiment of the present invention;

FIG. 27 is a view illustrating bulb exposure when an exposure control ring rotates clockwise for explaining an electronic shutter driving method according to a second preferred embodiment of the present invention;

FIG. 28 is a view illustrating bulb exposure when an exposure control ring rotates counterclockwise for explaining an electronic shutter driving method according to a second preferred embodiment of the present invention.

DESCRIPTION OF PREFERRED EMBODIMENTS

Preferred embodiments of the present invention will now be described in detail with reference to the accompanying drawings.

Figure 1:
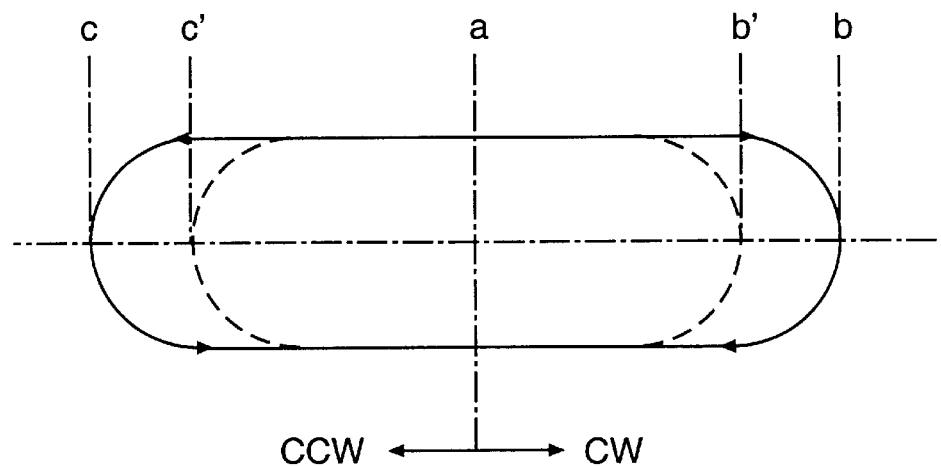
FIG. 1 is a view illustrating an electronic shutter driving method of a camera according to the present invention.

Referring to FIG. 1, reference letter (a) refers to an initial position of a focus control lens. The initial position (a) of the focus control lens is fixed between a minimum zoom position (b) and a maximum zoom position (c), and by first driving means, a focus lens is zoomed out according to a measured distance value, measured by a distance-measuring circuit.

In the above, assuming that the total number of steps of the above automatic focus control is 40 steps, the initial position (a) is a 20th step, the maximum zoom position (c) is the 40th step and the minimum zoom position (b) the 1st step.

More specifically, the electronic shutter driving method of the present invention fixes the initial position (a) of the focus control lens zoom at the starting point of the automatic focus position control, and by rotating a rotation member, connected to the lens, either in a clockwise (CW) or a counterclockwise (CCW) direction, performs an automatic focus control of the focus control lens.

As a result, the present invention reduces zooming time, when going from the minimum zoom position to the maximum zoom position and vice versa, to a level of at least half that of the prior art.

FIGS. 2–8 will now be referred to explain an electronic shutter driving system for cameras of the present invention operating as in the above.

Figure 2:
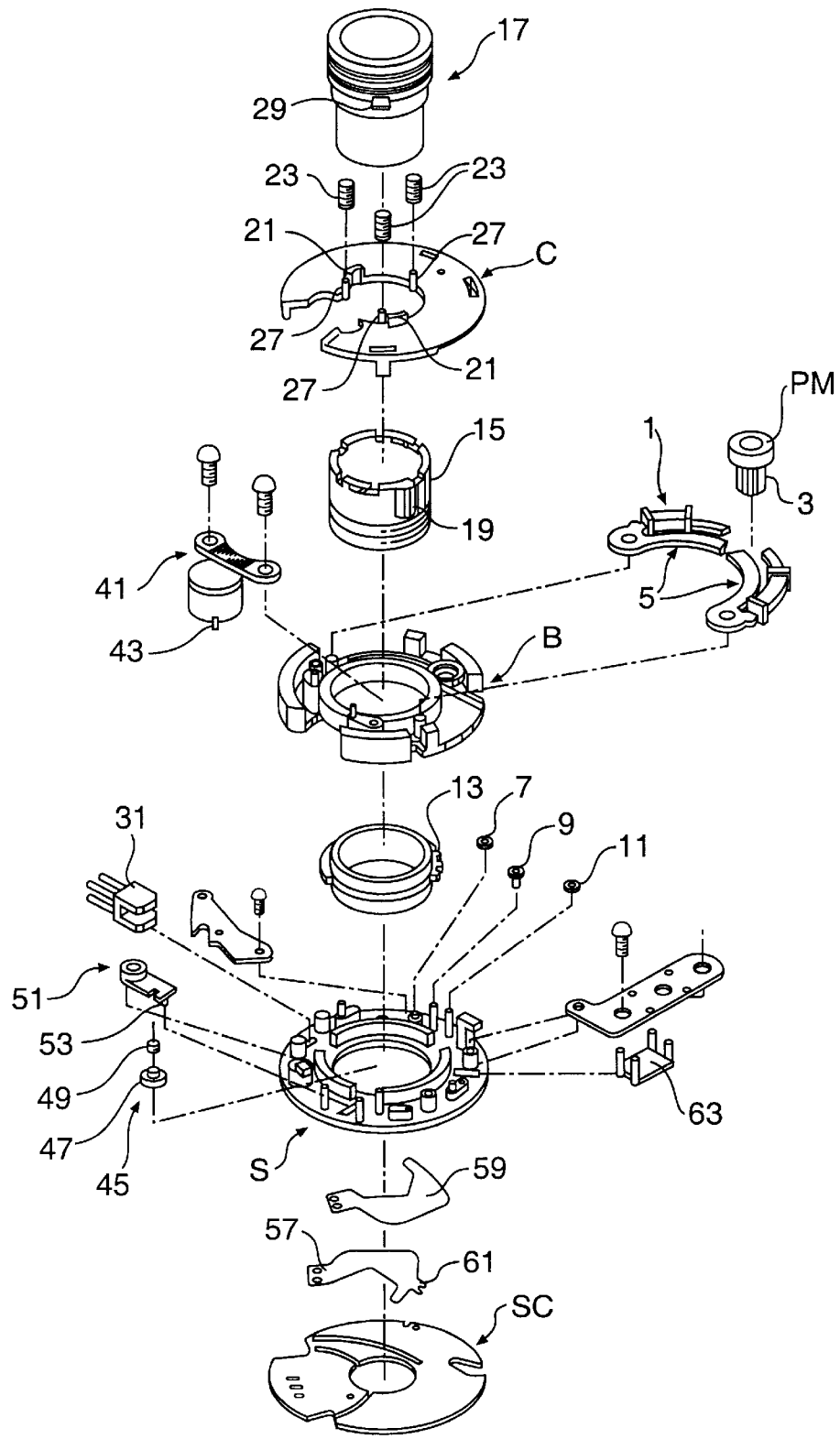
FIG. 2 is an exploded perspective view illustrating an electronic shutter driving device for cameras according to a first embodiment of the present invention.

In FIG. 2 illustrating a whole electronic shutter driving device for cameras according to a preferred embodiment of the present invention, reference numeral 1 refers to a power source of first driving means. This power source 1 is comprised of a motor gear 3, formed integrally with four permanent magnets (PM), and a pair of stators 5.

When driving, the power source 1 can rotate 90° at a time in the clockwise or counterclockwise direction by the four permanent magnets. The power source 1 is located at a motor base (B), and a motor cover (C) is connected to its upper side.

Figure 3:
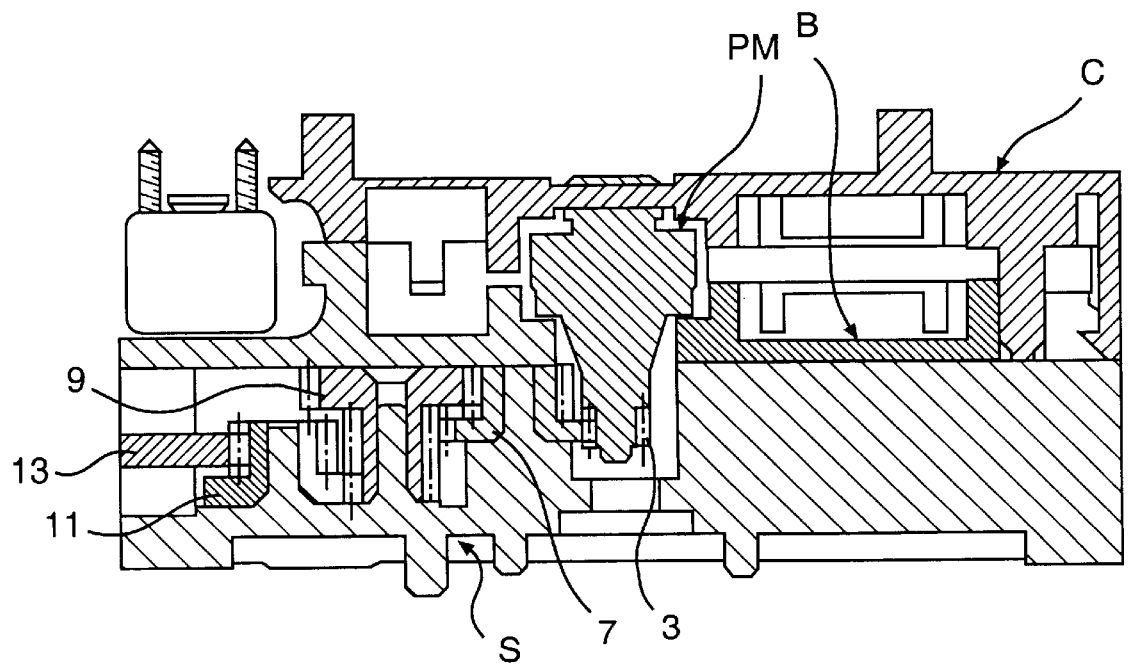
FIG. 3 is a longitudinal sectional view illustrating first driving means according to a first embodiment of the present invention.
Figure 4A:
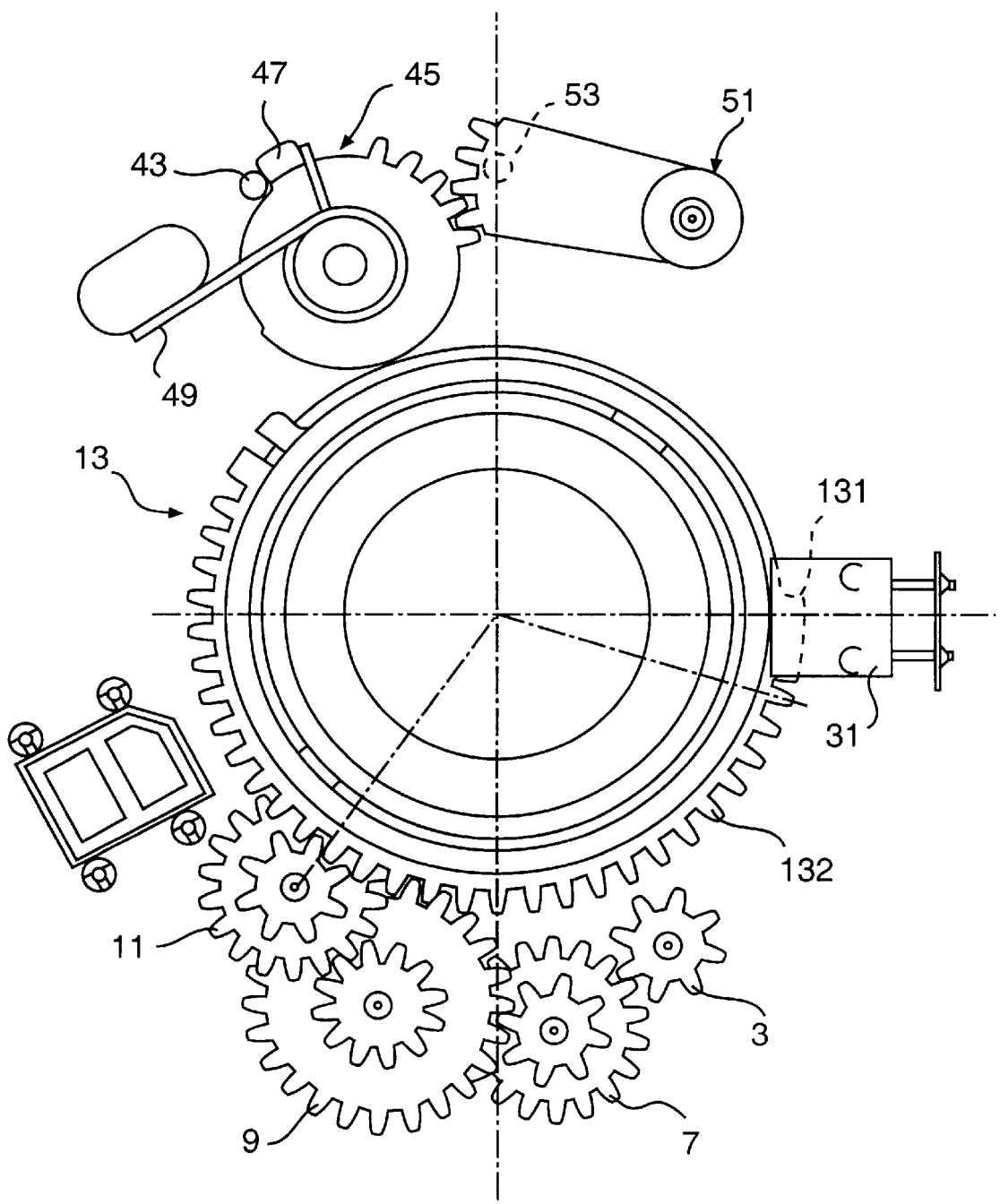
FIG. 4A is a bottom view illustrating first and second driving means according to a first embodiment of the present invention.
Figure 4B:
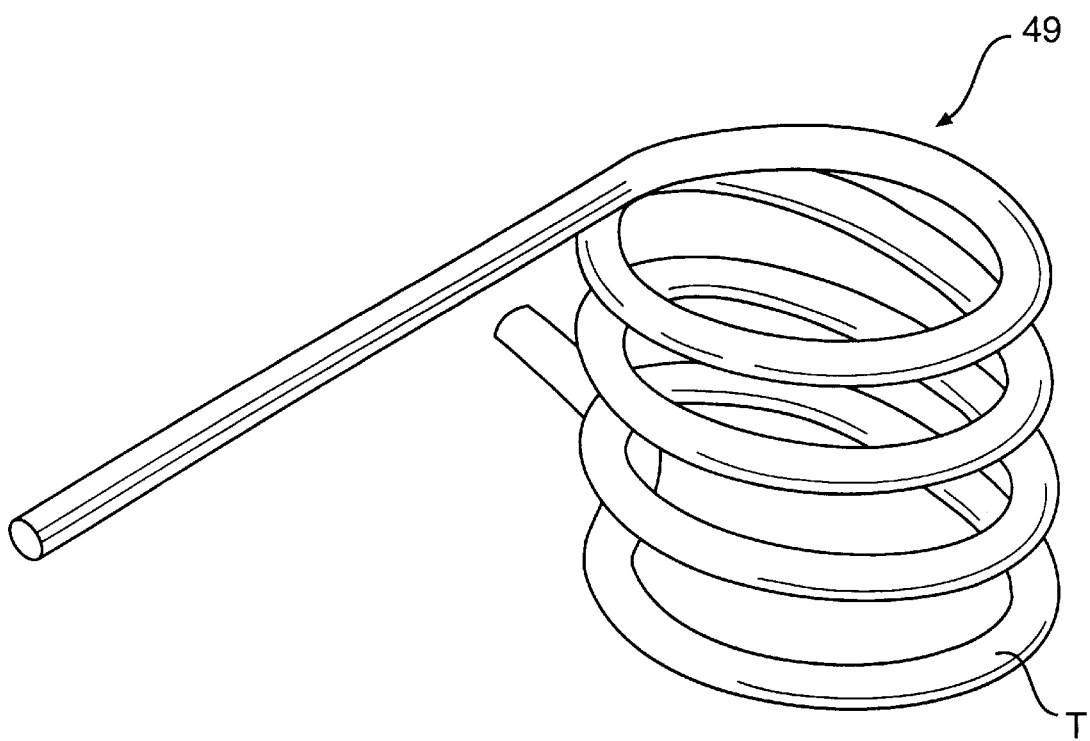
FIG. 4B is a perspective view showing an elastic member of FIG. 4A.

Also, the first driving means includes a speed reduction gear portion, meshed with the power source 1 and which transmits rotative force. The speed reduction gear portion is illustrated in FIGS. 3, 4A, and 4B in more detail and comprises a plurality of gears 7, 9, and 11 engaged with each other.

The gear 7 is meshed with the motor gear 3 of the power source 1, and the gear 11 is meshed with a focus control ring 13, connected to the focus control lens. The speed reduction gear portion is located at a shutter base (S) and is connected to the lower part of the motor base (B).

Figure 5:
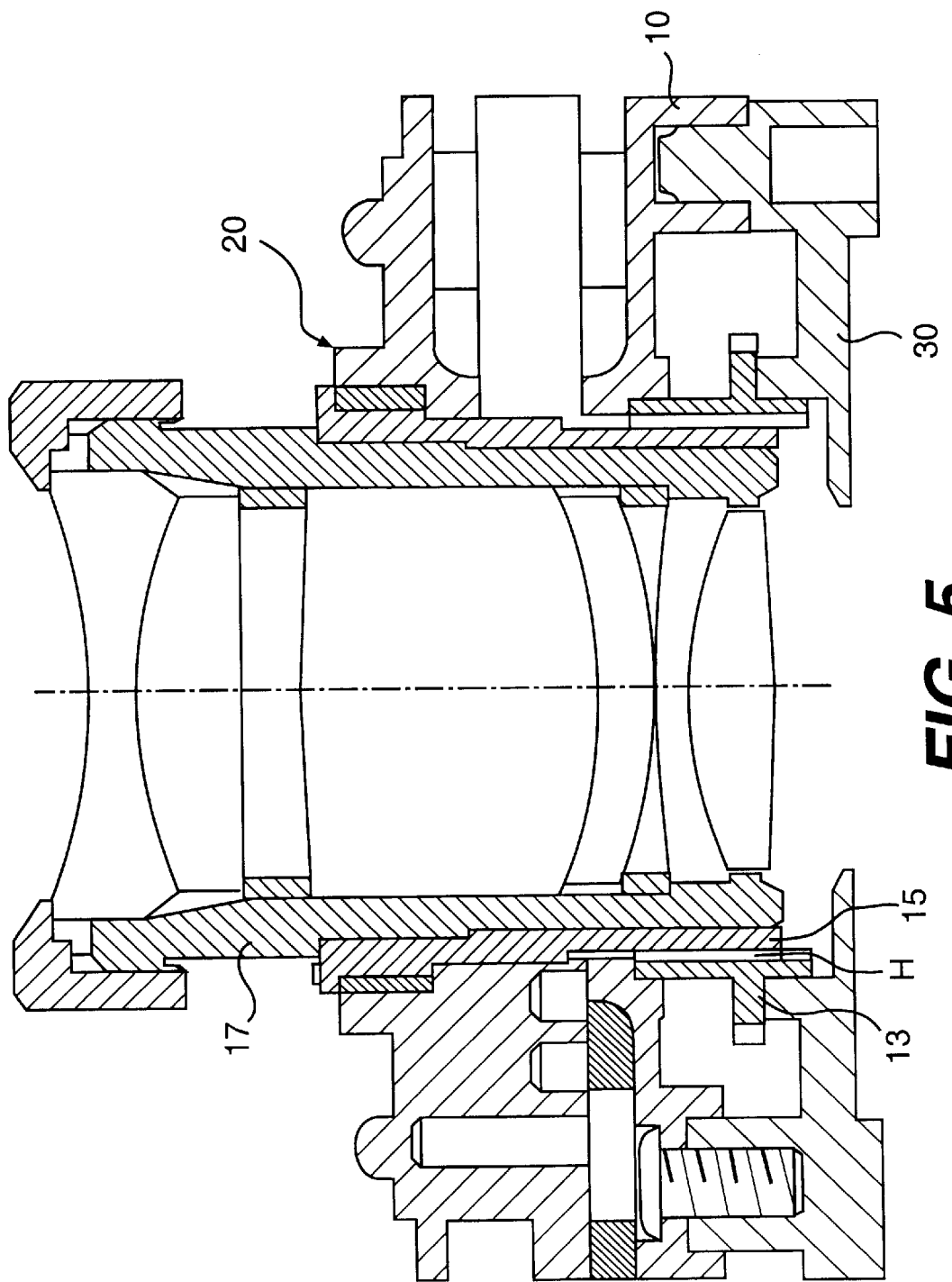
FIGS. 5 and 6 are respectively a longitudinal sectional view and a plan view illustrating a focus control lens and a rotating member in a merged state according to a first preferred embodiment of the present invention.

As shown in FIG. 5, a helicoid (H) is formed on the inner circumference of the focus control ring 13, which is connected to a lens holder 15. The lens holder 15 is integrally connected with a lens barrel 17.

The focus control ring 13 is rotatably supported between the shutter base (S) and the motor base (B).

Figure 6:
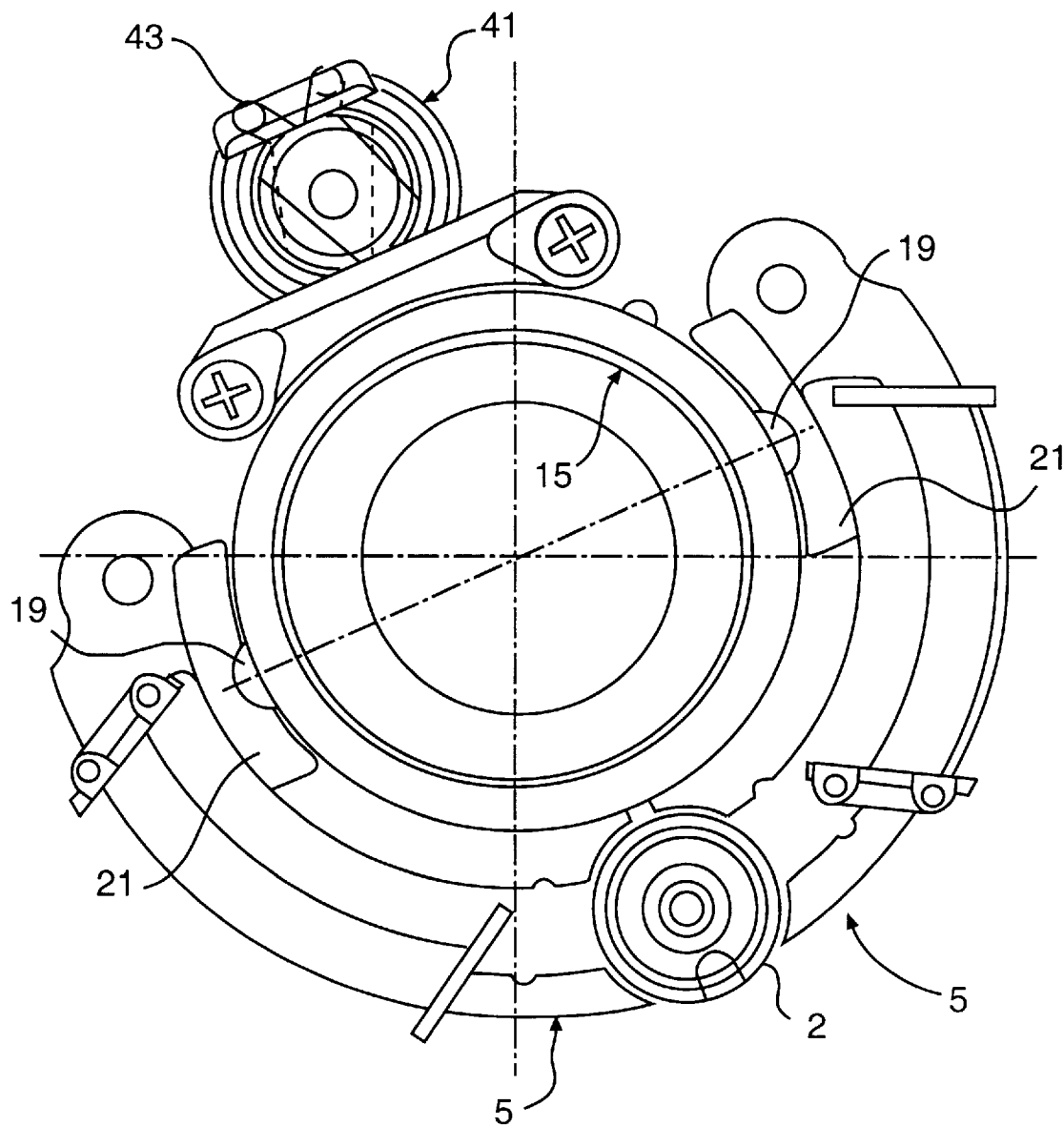

As shown in FIG. 6, a rotation preventing protrusion 19, formed on the outside of the lens holder 15, is inserted in the motor cover (C) such that it is tightly fitted with a rotation preventing groove 21.

Therefore, according to the rotating direction of the focus control ring 13, connected to the power source 1, the lens holder 15 moves in an up and down direction along the rotation preventing groove 21 formed on the motor cover (C) when viewing FIG. 5.

Coil springs 23, which act as elastic members, are interposed between the lens barrel 17 and the motor cover (B), and they prevent free movement caused by the meshing of the focus control ring 13 and the lens holder 15 (see FIG. 2).

Figure 7:
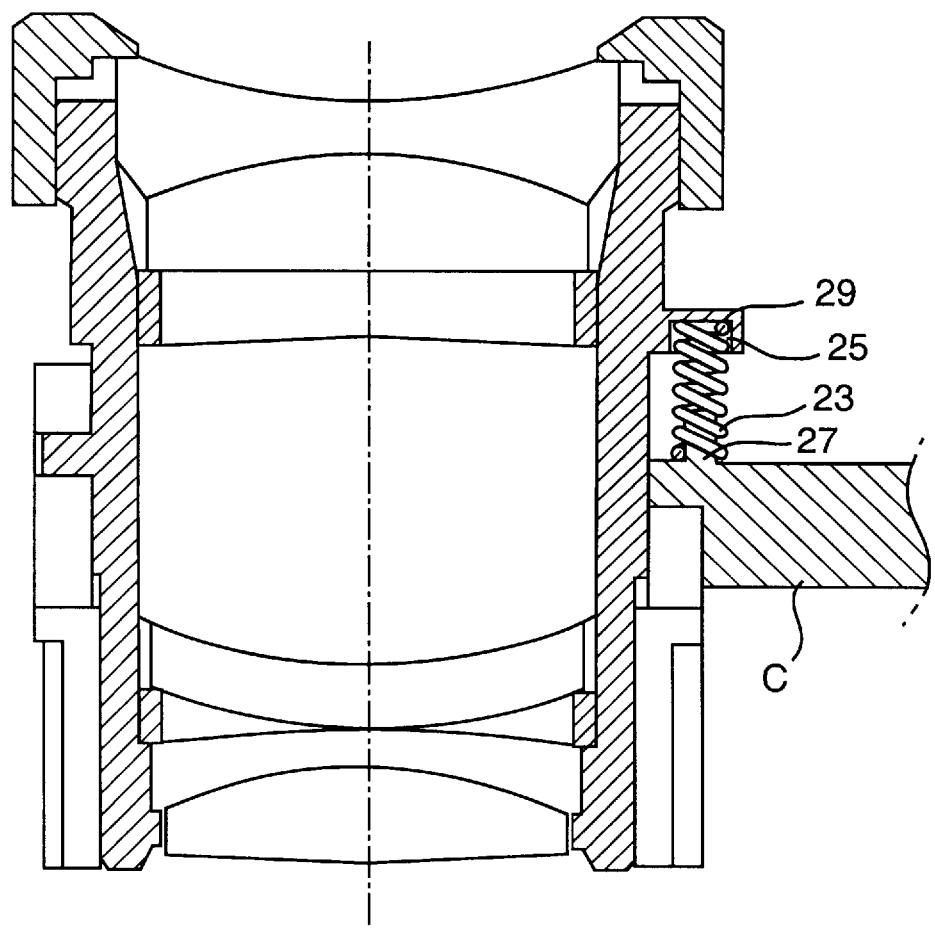
FIG. 7 is a longitudinal sectional view of a lens barrel support device according to a first preferred embodiment of the present invention.
Figure 8:
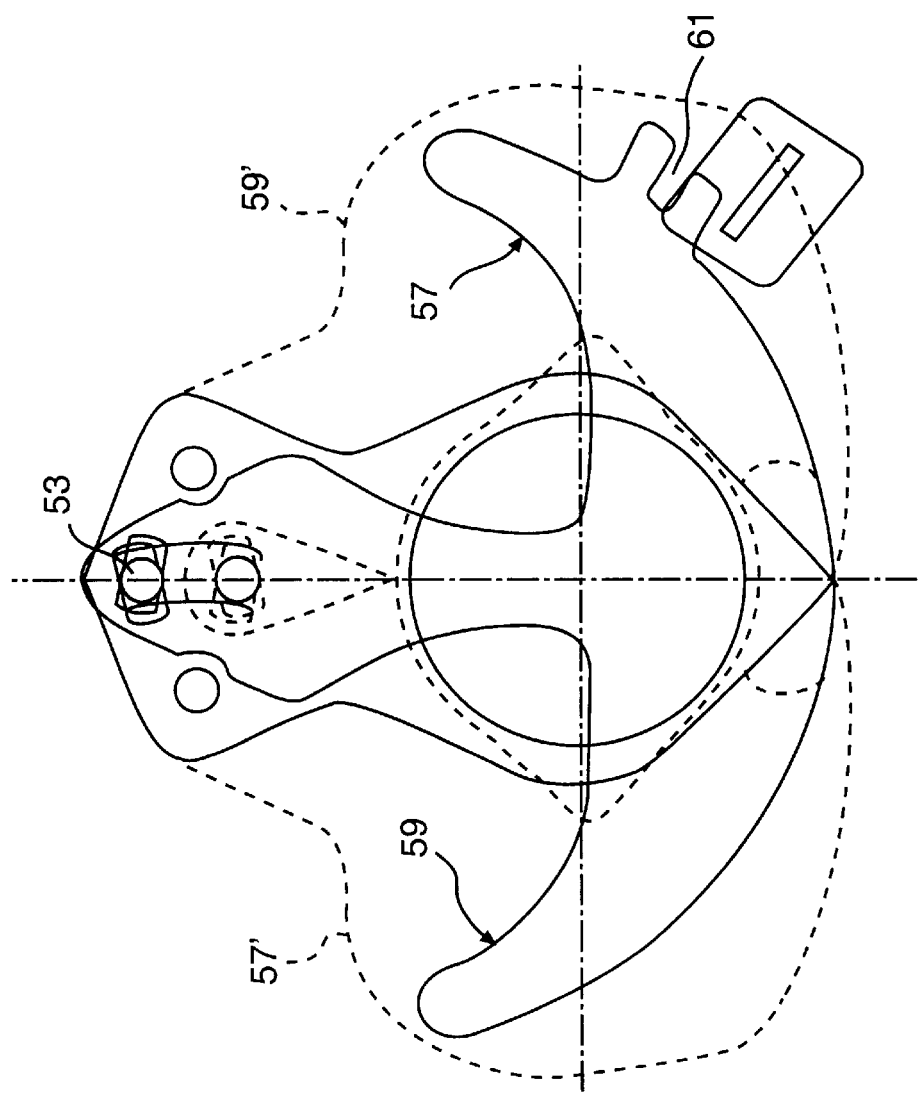
FIG. 8 is a plan view illustrating a sector according to a first preferred embodiment of the present invention.

As shown in FIG. 7, the lens barrel 17 interposes the coil spring 23 between a groove 25 formed in a protrusion 29 of the lens barrel 17 and a pin 27 formed on the motor cover (C), and, in this way, the lens barrel 17 is structured to always receive force in the upward direction (in the drawing).

In addition, the electronic shutter of the present invention includes initial position detecting and regulating means for adjusting the focus control ring 13 to the initial position when the electronic circuit portion is turned on from an off state and after it is detected that the focus control ring 13 is not in the predetermined initial position, or when the shutter begins its operation after the distance of the subject and the exposure value has been calculated when the shutter switch is operated.

As can be seen in FIG. 4A, the initial position detecting and regulating means comprises a protrusion 131, a gear portion 132 (formed on the focus control ring 13), and a photo interrupter 31.

When the protrusion 131 of the focus control ring 13 is not in the initial position, the photo interrupter 31 sends a signal to the power source 1 to rotate the focus ring 13 in a clockwise direction until it reaches the initial position.

In addition to having an automatic focus device, the electronic shutter driving device of the present invention also includes an automatic exposure control device.

This automatic exposure device has an automatic exposure meter 41 as a separate driving means which is a second driving means.

Referring to FIGS. 2, 4A and 4B, the automatic exposure meter 41 includes a boss 43, which rotates in one direction or the other according to the direction in accordance with an electric current applying direction.

The boss 43 is engaged with a catch projection 47 of the gear lever 45, which is supported by a shutter base (S) so that it can rotate. An elastic member 49 is fixed on the gear lever 45 and is elastically supported by the shutter base (S).

As a result, the automatic exposure meter 41 always receives elastic force in the counterclockwise direction, and when it is rotated in the clockwise direction, it does so pushing against the elastic force of the elastic member 49.

As can be seen in FIG. 4B, the elastic member 49 has elastic force in a circumferential direction, and a plurality of turns (T) forming the elastic member 49 create elastic force also in an up-down (vertical) direction.

The elastic member 49 applies elastic force to a sector lever 51 so that a sector can always stay in a closed state.

As the bounce of the gear lever 45 and sector lever 51 can be absorbed by this structure, double opening of the sector can be prevented.

Also, the gear lever 45 is meshed with the sector lever 51, which is joined with the shutter base (S) such that it can rotate, and the sector lever 51 has a sector pin 53 and is joined simultaneously with two sectors 57 and 59.

Through this structure, the sectors 57 and 59 are biased by the elastic member 49 in closed states. While rotating in a clockwise direction, the automatic exposure meter 41 pushes against the force of the elastic member 49 and opens the sectors 57 and 59.

As shown in FIGS. 2 and, 8, the sectors 57 and 59 are structured in the conventional manner, secured and supported in the shutter base (S) and joined with a sector cover (SC) on their lower sides.

A slot 61 is formed on at least one side of the sector 57, and the slot 61 is detected by a photo reflector 63 fixed on the shutter base (S), and through this detection, a starting point of automatic exposure control is established.

That is to say, the sectors 57 and 59 open as shown in the broken lines 57' and 59' by the clockwise rotation of the automatic exposure meter 41. At this point, the photo reflector 63 recognizes the opened starting point of the sector 57 and allows for the control of the exposure value calculated by the light-measuring circuit portion.

Based on the electronic shutter driving device as explained above, the electronic shutter driving method and operation of this embodiment will now be explained.

First, an initial position is established so that the initial position of zoom in/out of the focus control lens is located in the central step of all the automatic focus control steps.

At this point, the initial position detecting and regulating means detects the position of the focus control ring 13, connected to the focus control lens, and controls the initial position.

The above operation will now be described with reference to FIGS. 9 and 10.

After the shutter switch is operated, the distance-measuring circuit portion and the light-measuring circuit portion calculate the distance and exposure values of the subject. Next, when either the shutter starts in response to the calculated values, or the power is turned on in the electronic circuit portion, the power source 1 rotates clockwise and, as shown in FIG. 9, the focus control ring 13 also moves clockwise.

At this time, if it is supposed that the positioning of the photo interrupter 31 at the gear portion 132 of the focus control ring 13 is at an initial position, the CPU (not shown) clears a counting means, which counts the number of drive pulse signals, to '0' and determines whether the present state of the photo interrupter 31 is at 'H' or 'L'.

In the above, 'H' represents a state when the signal of a luminescent portion is cut off and not reaching a photoelectric portion, and 'L' represents a state where the signals of the luminescent portion reaches the photoelectric portion and when they both output signals.

Next, a clockwise drive pulse is applied to the photo interrupter 31 and it is determined again whether the photo interrupter 31 is at 'H' or 'L'. If it is in the same state, the counter means is added by "1" (step S4), and if the photo interrupter 31 is not in the same state, the counter is cleared to '0'.

Here, because the photo interrupter 31 is positioned in the gear portion 132 of the focus control ring 13, even if a clockwise drive pulse is applied, the counter means is repeatedly cleared to '0'.

If the photo interrupter is positioned in the protrusion 131 of the focus control ring 13 by the above clockwise drive pulse, the counter means determines if the value is above a pre-set fixed value (for example, 8) (step S6) and it is determined if the state of the photo interrupter 31 is in an 'H' state.

At this time, if it is determined that the state of the photo interrupter is in 'H', it is recognized that the present location of the focus control ring 13 is at its protrusion 131, a clockwise drive pulse is applied, and the time when the state of the photo interrupter 31 is changed from 'H' to 'L' is detected (steps S8 and S9).

Figure 11:
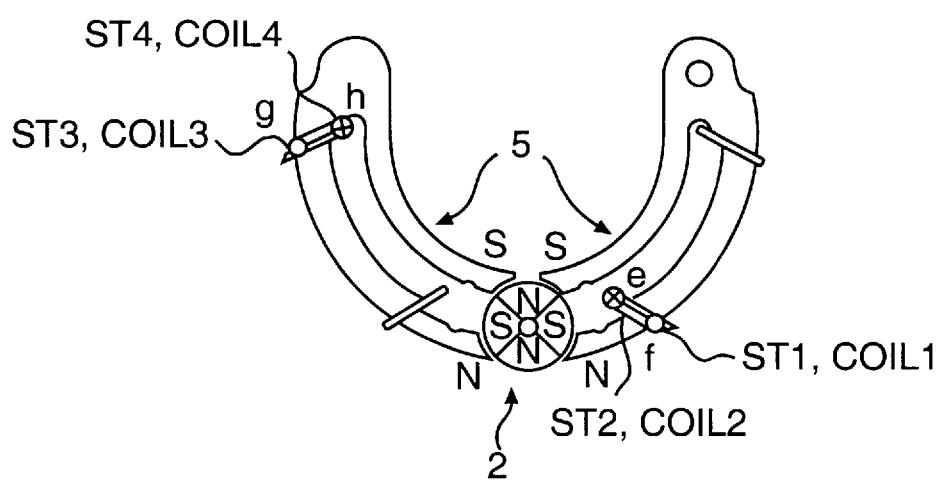
FIG. 11 is a view illustrating an initial position of a power source according to a first preferred embodiment of the present invention.

Finally, a circuit (not shown) checks if the power application state of the step drive power source 1 is in the initial position, as shown in FIG. 11, and the power is turned off in this state.

However, if the state of the step drive power source 1 is not identical to that shown in FIG. 11, a clockwise drive pulse is continually applied, the power is turned off after reaching a state of that shown in FIG. 11, and the focus control ring 13 is controlled to the initial position.

Next, the step drive power source 1 depicted in FIG. 11 determines if the first and third coils are in the 'H' state (step S10), and if they are, power is turned off.

As one step of the step drive power source 1 is composed of two drive pulses, the determination of two 'H's or two 'L's is possible during driving by one step.

When the photo interrupter 31 is located in an open portion 133 of the focus control ring 13, the circuit (not shown) clears the means, that counts the number of drive pulse signals, to '0', operates the photo interrupter 31, and determines if its present state is in 'H' or 'L'.

If it is detected to be in 'L', the above counter means rotates the step drive power source 1 in the clockwise direction until it surpasses a fixed value (for example 8).

In the above, the rotating of the step drive power source 1 by the counter means until it passes a fixed value is for the precise determination of the position of the focus control ring 13 when initial position of the step drive power source 1 is not in a position as that shown in FIG. 11.

The circuit (not shown) detects the present location of the focus control ring 13 at the open portion 133 by the continuous clockwise rotation of the counter means until it is past the fixed value, and the drive pulse is reversed so that the step drive power source 1 rotates in the counterclockwise direction (step S11).

By the reverse drive pulse, the focus control ring 13 rotates counterclockwise, and it is determined if the initial state of the photo interrupter 13 has changed from 'L' to 'H', and if it has, control to the above step (S10) is realized.

After the circuit (not shown) detects the point of change, it converts the drive pulse to a normal pulse, rotates the focus control ring 13 clockwise, and the focus control ring 13 is controlled to its initial position as in the first method above.

After the initial position of the focus control lens and focus control ring 13 is established, according to the shutter switch operation, the focus control lens is zoomed out to an automatic focus location, determined by the distance-measuring circuit, thereby performing automatic focus.

At this point, the focus control lens 13 is moved to the maximum or minimum zoom location according to the direction in which the power source 1 rotates the focus control ring 13.

The focus control lens is integrally joined with the lens holder 15, and because the lens holder 15 is prevented from rotating by the motor cover member 20, the rotating operation of the focus control ring 13 moves the focus control lens in a linear direction.

That is to say, the focus control ring 13 is rotated in the clockwise direction (see FIG. 4) through the use of the speed reduction gear portion by the power source 1, the focus control lens is zoomed toward the sector side (toward the bottom in FIG. 5), and zoomed toward the subject when the focus control ring 13 is rotated in the counterclockwise direction.

Here, the power source 1 is rotated by 90° when driven in one step and the focus control ring 13 is also rotated in the same amount. In addition, the focus control ring 13 comes to have many focus control steps.

At the time focus control is completed, as the power source 1 has at least a 20 ms stabilizing interval, an over-run phenomenon is prevented.

Also, at the time focus control is completed, automatic exposure is performed according to the exposure value calculated in the light-measuring circuit portion by the second drive means. Here, the automatic exposure meter 41, as the second drive means, rotates clockwise (in FIG. 4A) while overcoming the elastic force of the elastic member 49 according to the application of an electric current, and by the rotation of the gear lever 45 and the sector lever 51, connected to the automatic exposure meter 41, the sectors 57 and 59 are opened.

Figure 12:
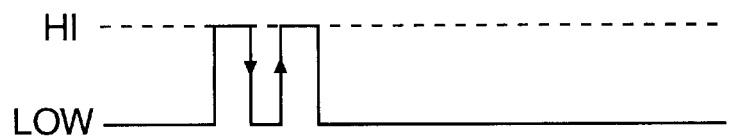
FIG. 12 is a view illustrating an exposure starting point of a sector according to a first preferred embodiment of the present invention.
Figure 13A:
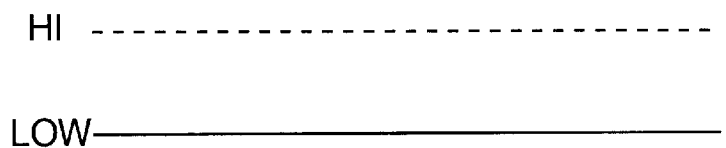
FIGS. 13A to 13D are views illustrating a port reflector error signal according to a first preferred embodiment of the present invention.
Figure 13B:
Figure 13C:
Figure 13D:
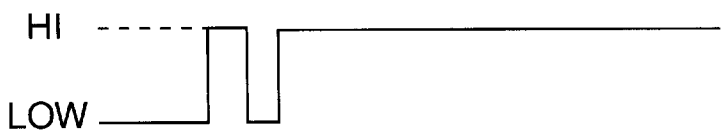

At this time, to precisely control the opening time (amount of exposure) of the sectors 57 and 59, the present invention detects the beginning point of exposure. This detection is realized through the photo reflector 63, recognizing the slot 61 location of the sector 57. This output signal is shown in FIG. 12.

Namely, since the photo reflector 63 generates two high pulse signals and two low pulse signals corresponding to the slot 61 of the sector 57, one of either is used as an exposure starting point, and, by doing so, a precise amount of exposure can be controlled.

Error signals of the photo reflector 63 appear in FIGS. 13A, 13B, 13C and 13D.

As is illustrated, when the signal of the photo reflector 63 appears as one of the signals (I), (II) (III) and (IV) of the photo reflector 63 shown in FIGS. 13A–13D, respectively, a control circuit (not shown) determines that the state is an error state and indicates an error message to an indication device.

On the other hand, as the sectors 57 and 59 close when the automatic exposure meter 41 receives an opposite electrical current, the elastic member 49 rotates the gear lever 45 in the counterclockwise direction by its elastic force.

[Second Embodiment]

The description hereinafter is an electronic shutter drive system and method according to a second embodiment of the present invention with reference to FIGS. 14 to 29.

Figure 16:
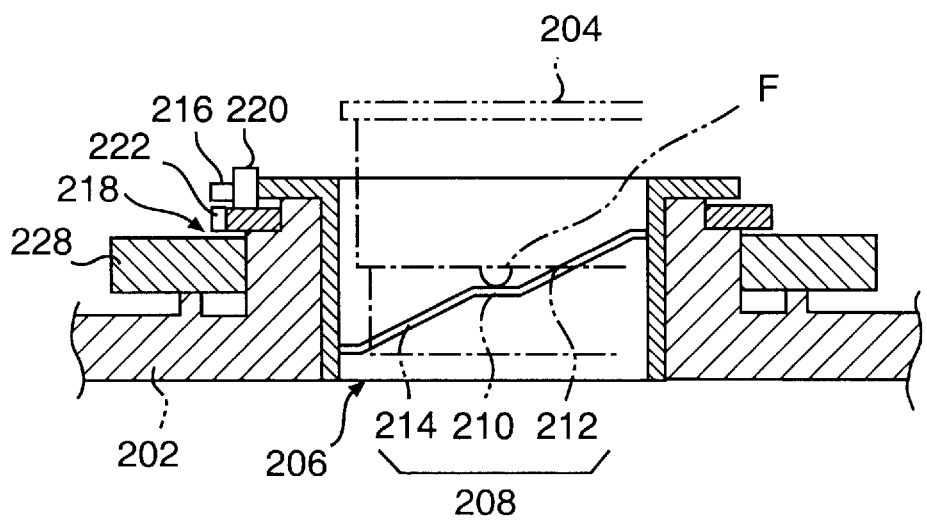
FIG. 16 is a side sectional view of an electronic shutter driving system according to a second preferred embodiment of the present invention.
Figure 17:
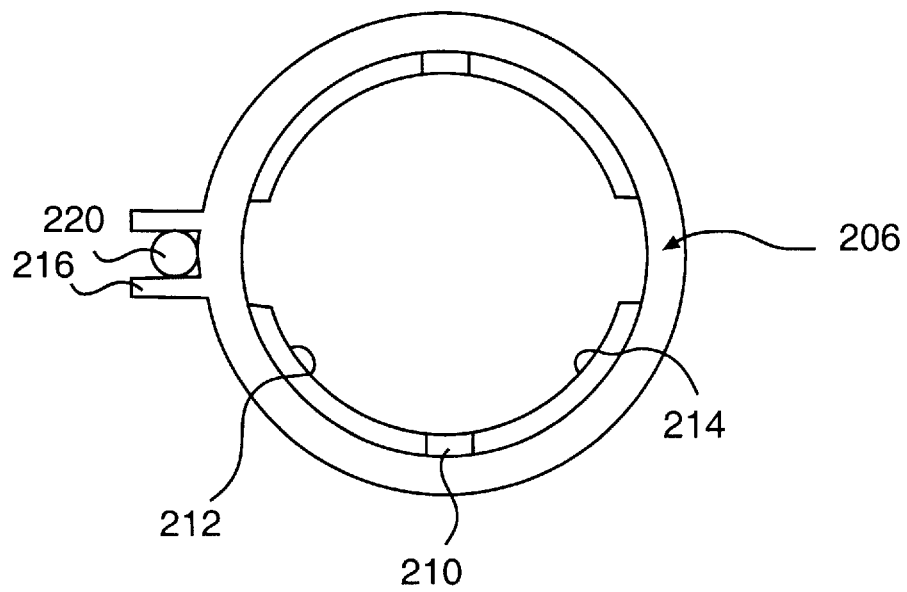
FIG. 17 is a plan view of a focus control cam applied to an electronic shutter driving device according to first and second preferred embodiments of the present invention.

Referring first to FIGS. 16 and 17, a lens barrel 204 is located in the inner part of a shutter base 202 and also in a focus control cam barrel 206, and it is structured so that it can zoom out/in in the direction of the cam barrel axis according to the rotation amount and direction of the focus control cam barrel 206.

This lens zooming is generally realized by the movement of the lens barrel in response to the cam curvature. The focus control cam barrel 206 of the preferred embodiment includes a cam portion 208.

The cam portion 208 includes a horizontal portion 210, corresponding to the initial position; a first cam portion 212, which extends toward the front from the horizontal portion 210 following the inside face of the focus control cam barrel 206; and a second cam portion 214, which extends toward the rear from the horizontal portion 210 following the inside face of the focus control cam barrel 206.

A fork 216 is formed on one side of the focus control cam barrel 206. The fork 216 is a means for receiving the rotating force of the focus control ring 218, fixable to rotate on the outer circumference of the shutter base 202.

The focus control ring 218 includes a pin 220 joined with the fork 216, and teeth 222 are formed around roughly ½ the outer circumference of the focus control ring 218. Also, a protrusion 223 is formed extending outward on the outer circumference of the focus control ring 218.

The final gear of the speed reduction portion 224 is meshed with the teeth 222 and is structured so as to enable receiving of the rotational force by a stepping motor (M).

The speed reduction portion 224 receives rotational force from a single power source and comprises a gear train for first dividing and transmitting this rotational force to the focus control ring 218 and exposure control ring 228.

As a result, the speed reduction portion 224 has a speed reduction gear 230 for exposure control, and a plurality of speed reduction gears 232a, 232b, 232c, 232d, and 232e for focus control. A motor gear 234 is also provided which is a two-level gear. Because of its structure, the motor gear 234 is joined to both the reduction gear 230 and the plurality of reduction gears 232a–232e.

Through the above gear arrangement, the teeth 222 are meshed with the speed reduction gear 232e which is the final gear of the speed reduction portion 224, and receive rotational force.

Figure 14A:
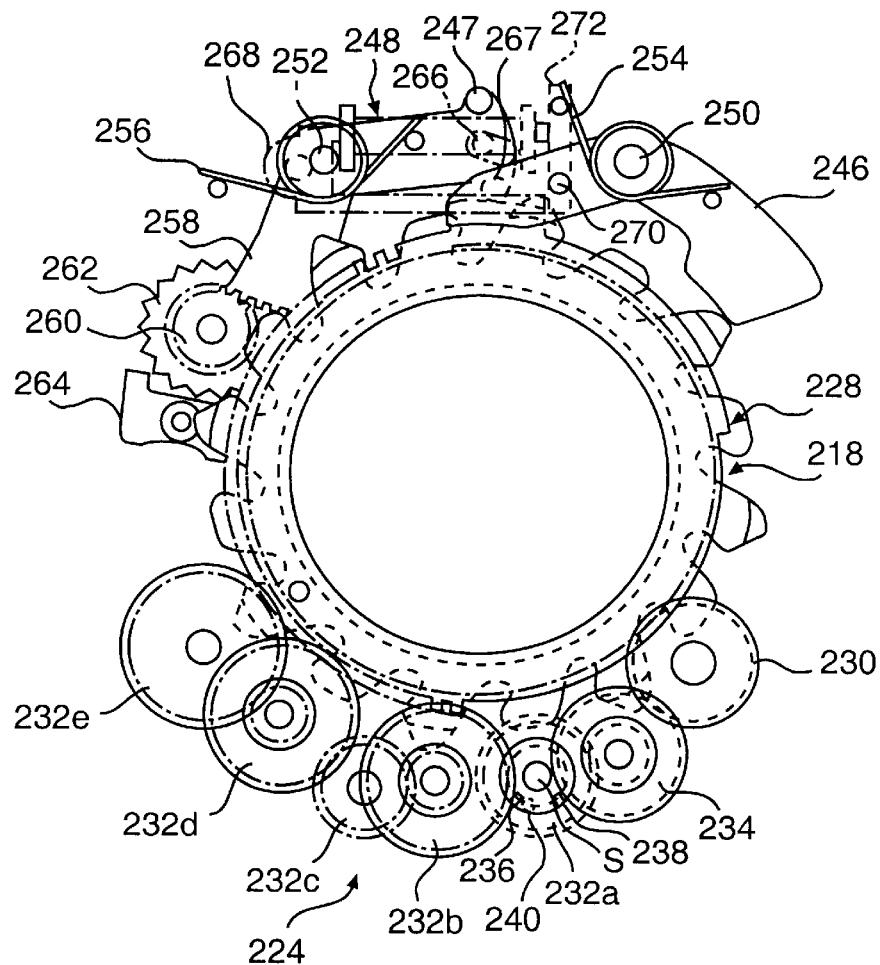
FIGS. 14A and 14B are views of a electronic shutter driving system for cameras according to a second preferred embodiment of the present invention.
Figure 14B:
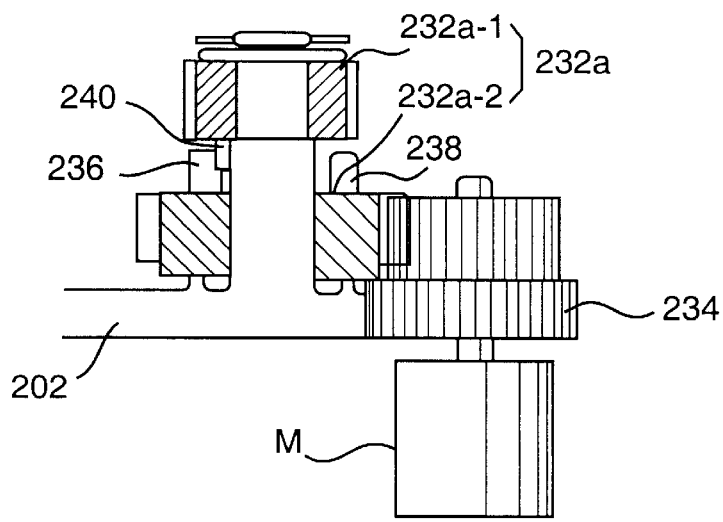
Figure 15A:
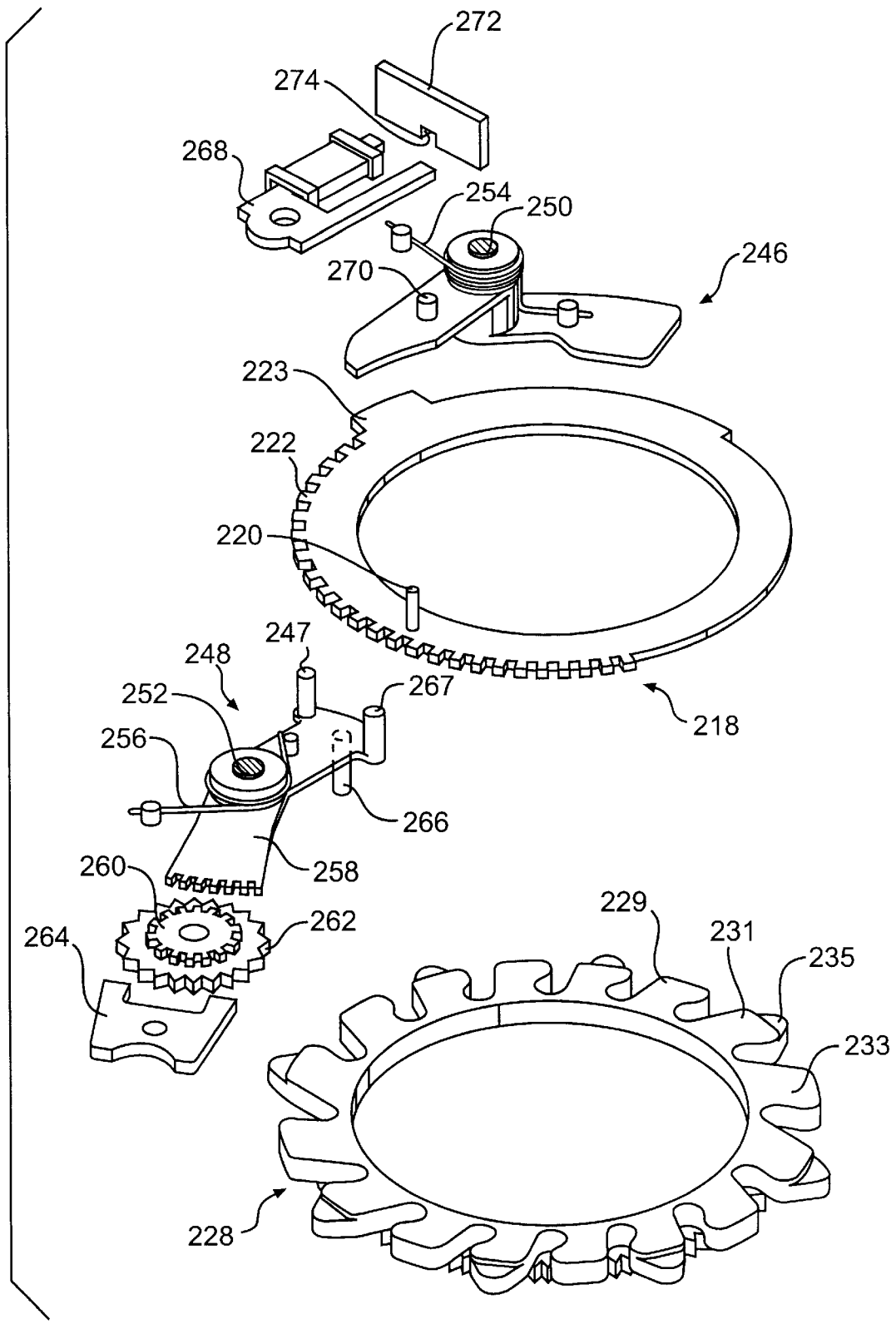
FIG. 15A, is an exploded perspective view of an electronic shutter driving device shown in FIG. 14.
Figure 15B:
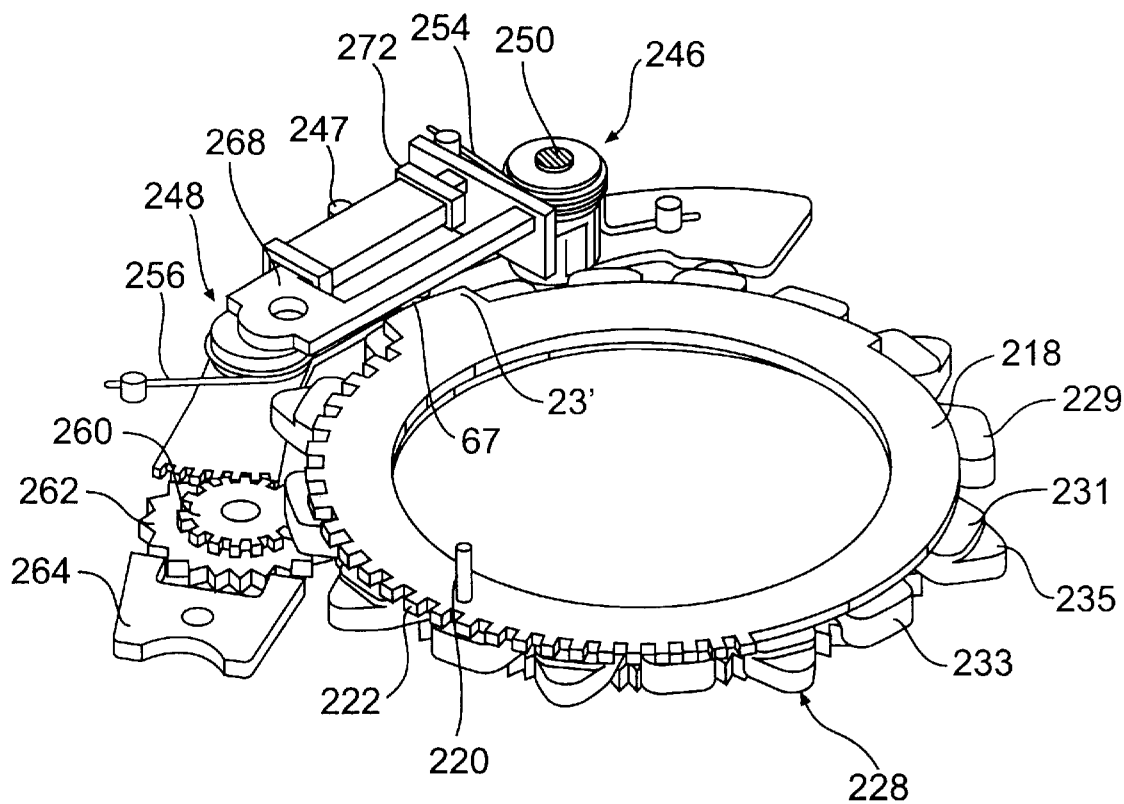
FIG. 15B is an assembled view of FIG. 15A.

The first speed reduction gear 232a is comprised of an upper portion gear 232a-1 and a lower portion gear 232a-2 and, as shown in FIG. 14B, are fixed having an interval from a shaft (S) and able to rotate.

The above shaft (S) is rotatably structured having a fixed interval with the upper and lower gears 232a-1 and 232a-2.

Time-difference protrusions 236 and 238 are formed on the lower gear 232a-2 at an angle corresponding to one step. A slide protrusion 240 is formed on the upper gear 232a-1 and disposed between the time-difference protrusions 236 and 238.

The upper gear 232a-1 of the speed reduction gear 232a meshes with an adjacent speed reduction gear 232b so as to be able to transmit power thereto. The lower gear 232a-2 meshes with a motor gear 234 so as to receive the rotating force of the stepping motor.

The exposure control ring 228 is provided on its outer circumference with a plurality of protrusions 229' and a plurality of protrusions 231' which are arranged between the protrusions 229'. The protrusions 229' and 231' are arranged at an angle of 22.5 degrees. The protrusions 231' are respectively provided with extension ends 235' extending outward.

The exposure control ring 228 and the focus control ring 218 are concentrically disposed and relatively rotatable. On one periphery portion of the rings 228 and 218, a sector opening/closing means is provided to open and close the sectors.

The sector opening/closing means according to this embodiment comprises a sector close lever 246 rotatably coupled on the shutter base 202 by a pin 250, a sector open lever 248 rotatably coupled on the shutter base 202 by a pin 252, and elastic members 254 and 256 for respectively applying clockwise rotating force to the sector close lever 246 and the sector opening lever 248.

One end of each of the elastic members 254 and 256 is hooked on the shutter base 202, and each of the other ends thereof are respectively hooked on the sector close lever 246 and the sector open lever 248.

There is provided a governor means on one side of the sector open lever 248 to control the exposure. In this embodiment, the governor means comprises a worm gear 258 integrally formed on one end of the lever 248, a wormwheel 260 meshing with the worm gear 258, a governor gear 262 disposed on a common axis with the wormwheel 260 to be rotatably therewith, and an anchor 264 which is to be hooked on the governor gear 262.

The wormwheel 260, the governor gear 262 and the anchor 264 are all rotatably coupled to the shutter base 202.

Figure 19:
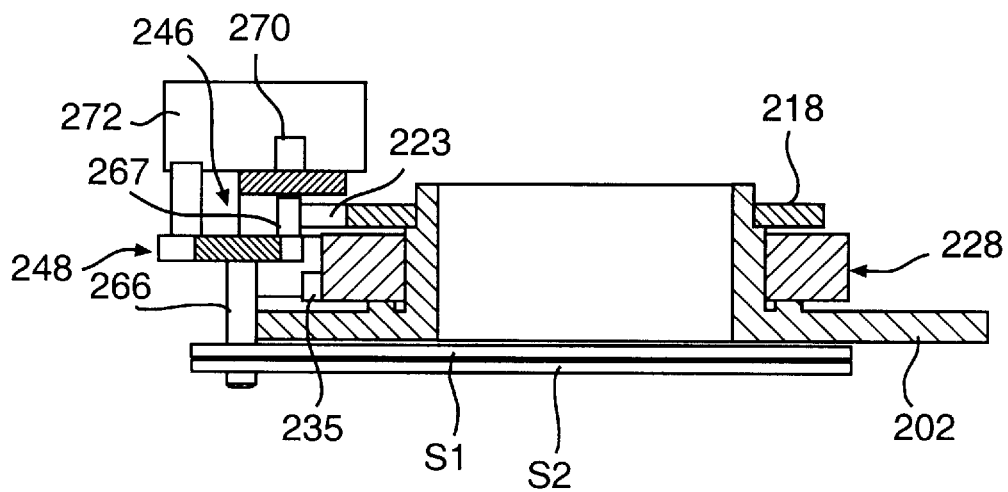
FIG. 19 is a side sectional view illustrating a position relationship between a focus ring and an exposure ring and a magnet according to a second preferred embodiment of the present invention.
Figure 20:
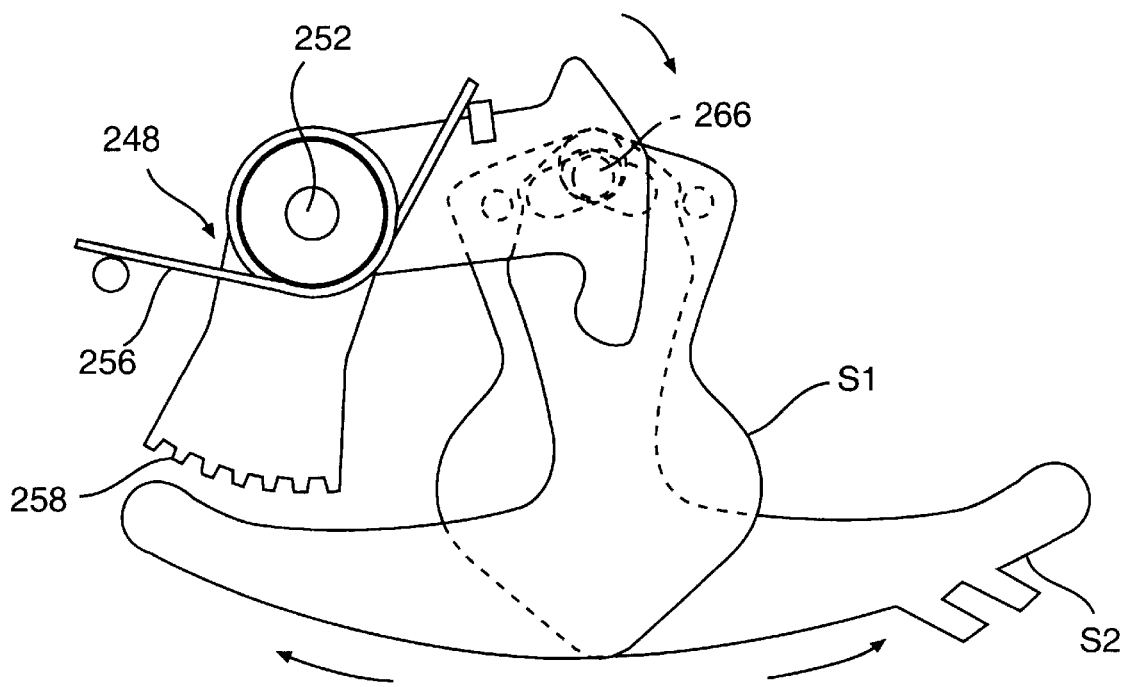
FIG. 20 is a view illustrating a position relationship between a sector and an open lever according to a second preferred embodiment of the present invention.
Figure 21:
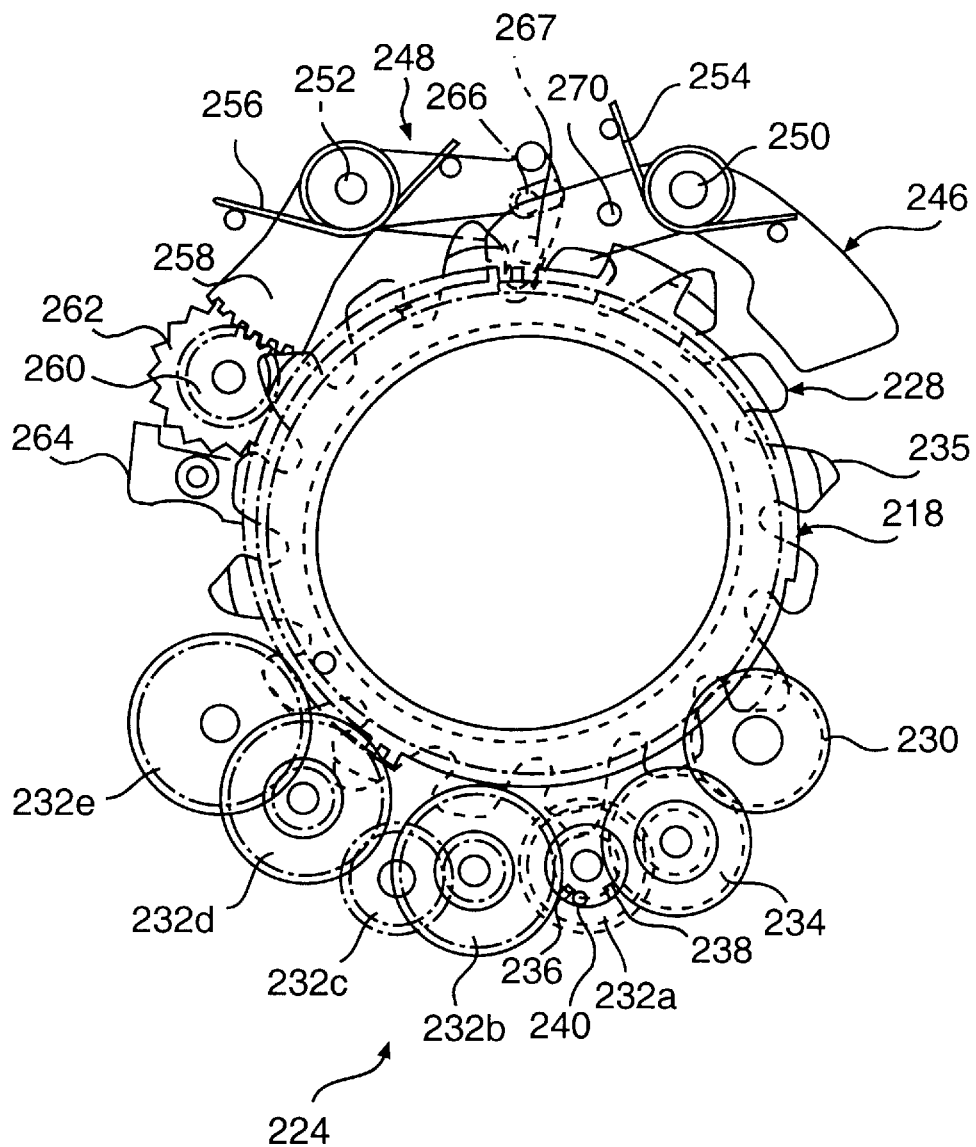
FIG. 21 is a view illustrating a state in which an electronic shutter driving device opens a sector according to a second preferred embodiment of the present invention.
Figure 22A:
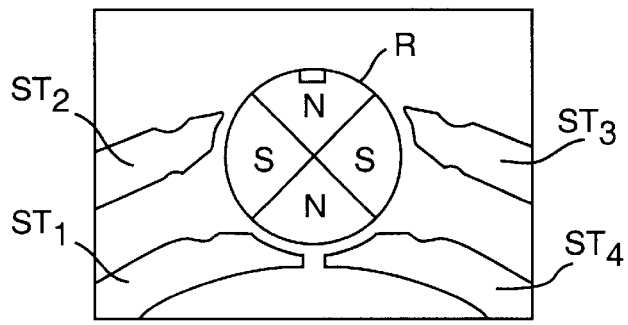
FIGS. 22A, 22B, 22C and 22D are views illustrating a step motor driving state of a fixed point control type used in a electronic shutter according to a second preferred embodiment of the present invention.
Figure 22C:
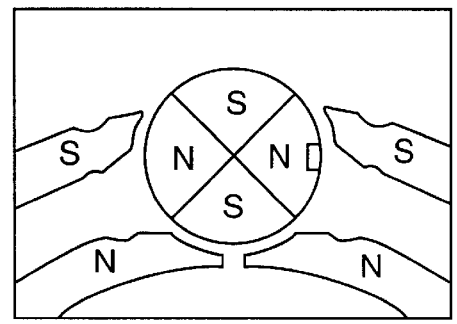
Figure 22B:
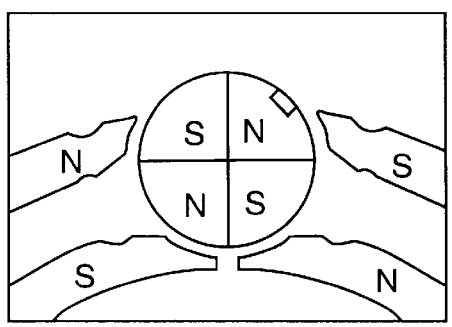
Figure 22D:
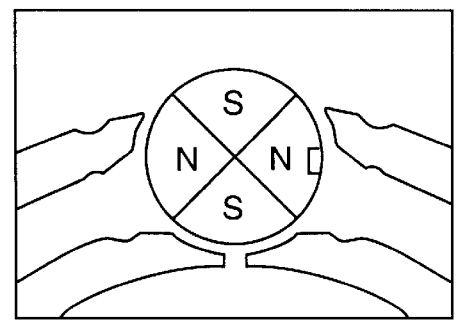
Figure 23:
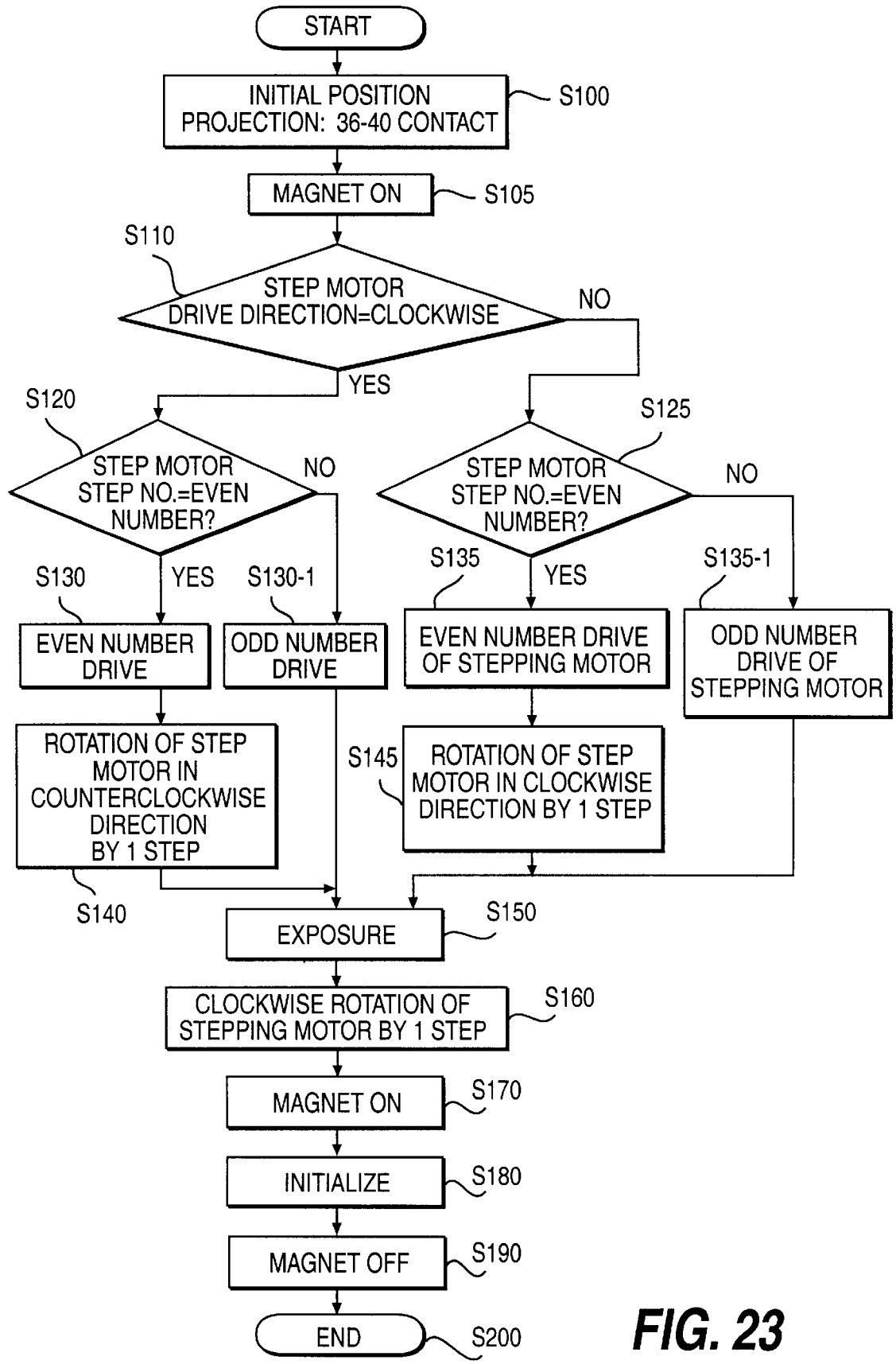
FIG. 23 is a flow chart of normal exposure for explaining an electronic shutter driving control method according to a second preferred embodiment of the present invention.

As shown in FIG. 19, the other end of the sector open lever 248 is connected by a pin 266 to the pair of sectors S1 and S2 so that it can open and close the sectors S1 and S2.

The sector close lever 246 is restrained or unrestrained by a magnet 268. That is, when electric power is applied to the magnet 268, the lever 246 is restrained, and when not applied to the magnet 268, the lever 246 is unrestrained.

This operation is realized by providing a sector close pin 270 on the sector close lever 246 so that the pin 270 can be located in a groove 274 of a restrain member 272 which is reciprocated by the magnet 268.

In this embodiment, the step motor M used as a drive source for driving the motor gear 234 in a positive or negative direction is divided into four sections at an angle of 90 degrees and has a magnetized rotor R (see FIGS. 22A, 22B, 22C and 22D).

The step motor M is applied with electric power at a speed of at least 20 m/s so as to obtain magnetic field stabilization before the electric power is turned off.

Figure 9:
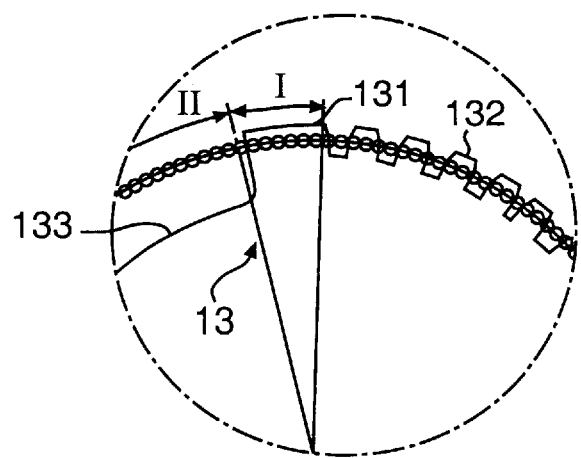
FIG. 9 is a view illustrating initial position detecting means according to a first preferred embodiment of the present invention.
Figure 10:
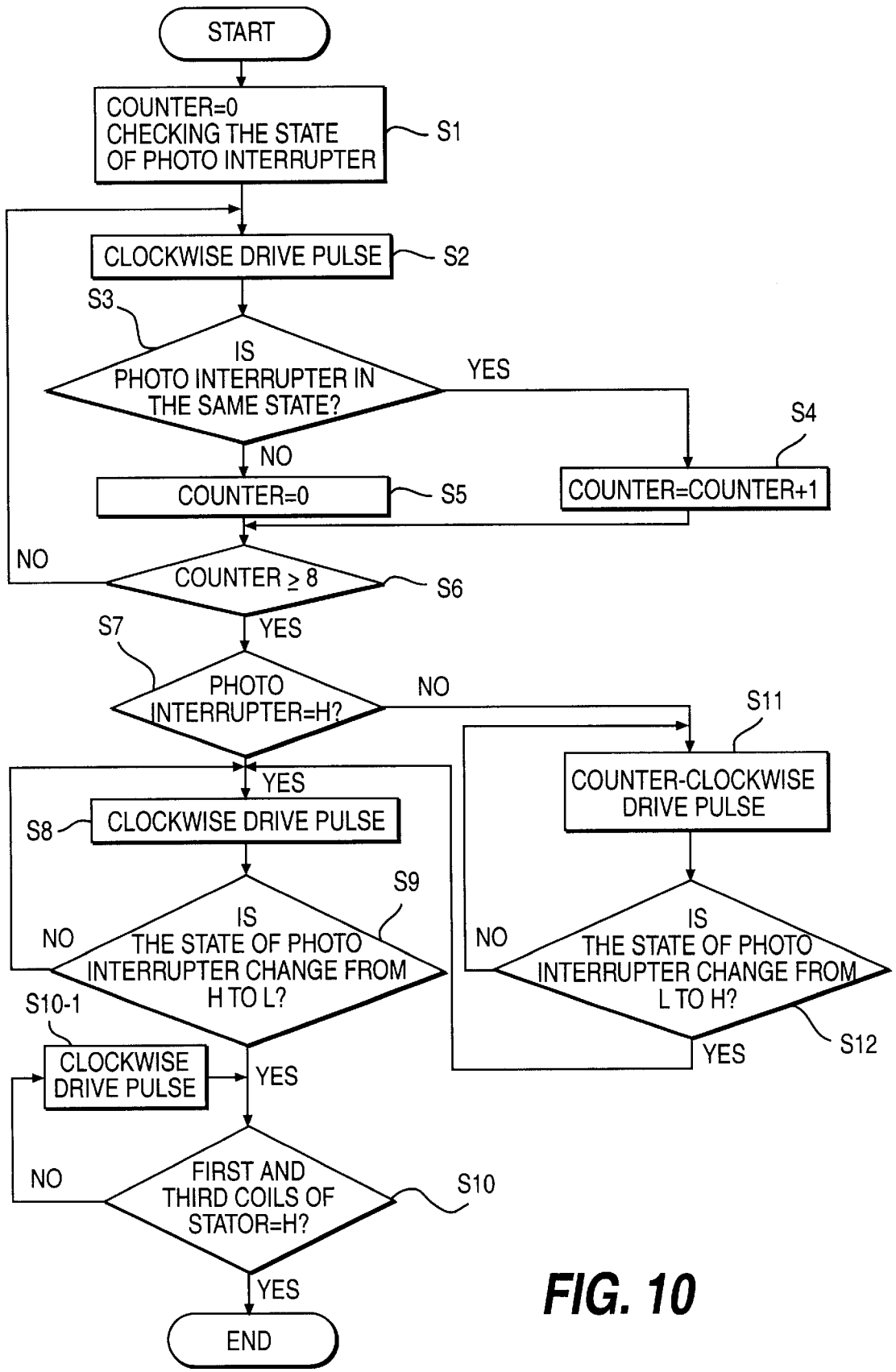
FIG. 10 is a flow chart of an initial position detecting method according to a first preferred embodiment of the present invention.

The above-described electronic shutter drive system according to this embodiment performs automatic focus control of the lens according to the drive process as shown in FIG. 9.

First, after an initial position of the focus control lens is established at a mid-step between the farthest zoom position (b) and the closest zoom position (c), a distance measuring circuit calculates the distance value of the object, and in response to the measured value, the focus control lens is zoomed out/in by the driving means.

Here, assuming that the total number of steps of the automatic focus control is 40 steps, the initial position of the focus control lens becomes the 20th step, the farthest zoom position (b) becomes 1st step, and the closest zoom position (c) the 40th step.

The initial position (a) of the lens is established by positioning a cam floor F of the lens barrel 204 on the horizontal portion 210 of the cam portion 208, or alternatively, by a method for controlling a focus control ring disclosed in Korean patent application No. 95-33888 filed by the present assignee, which is hereby incorporated by reference.

Therefore, since the initial position (a) is set as a starting point of the automatic focus control and the focus control ring connected to the lens is driven in a clockwise or counterclockwise direction, the focus control time can be shortened. This will be described more in detail hereinafter.

When the shutter starts to operate after completing light-measurement and distance-measurement, electric power is applied to the magnet 268 and the restraining member 272 is attached to the magnet 268 such that the sector close lever 246 located in the groove 274 is restrained by the sector close pin 270.

In this state, the step motor continues its rotation and the sector open lever 248 is released from the protrusion 223'. By this operation, the sector open lever 248 is biased by the elastic member 256 in a clockwise direction in the drawing (see FIG. 19).

The clockwise rotating force transmitted to the sector open lever 248 is further transmitted to the worm gear 258 of the governor means and rotates the wormwheel 260 together with the governor gear 262 so that governing operation can be realized by the anchor 264.

That is, although the worm gear 258 intends to rotate by receiving rotating force from the sector open lever 248 via the wormwheel 260, since opposite ends of the anchor 264 are alternatively engaged with the governor gear 262, the rotation of the worm gear 258 is restricted.

Figure 18:
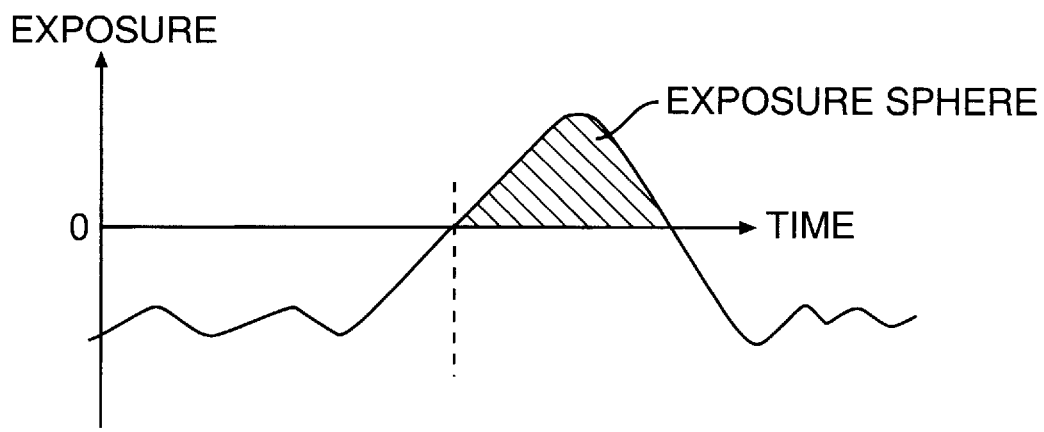
FIG. 18 is a view illustrating an exposure chart of an electronic shutter according to a second preferred embodiment of the present invention.

As a result, the rotating speed of the sector open lever 248 becomes slower than that of the exposure control ring 228 as illustrated in a graph of FIG. 18.

At this point, the step motor, as shown in FIGS. 22A, 22B, 22C and 22D, rotates by an angle of 90 degrees at a time. By this rotation, the focus control ring 218 rotates by a predetermined angle at a time, and the exposure control ring 228 rotates by one pitch (22.5 degrees) at a time.

However, since time is needed for the sector open lever 248 to be released from the protrusion 223' of the focus control ring 218, focus control should not be performed during this period. Therefore, in this embodiment, there is provided the horizontal portion 210 on the cam portion 208 so that focus control cannot be performed during this time.

Now, an electronic shutter driving method during the clockwise rotation of the step motor will be described with reference to FIGS. 23 through 28.

Immediately after the sector open lever 248 is released from the protrusion 223 of the focus control ring 218 and when the focus control ring and the exposure control ring rotate clockwise and the stepping motor rotates by four steps, a normal exposure method is as follows:

At the initial position(step S100), it is determined if the driving direction of the stepping motor M is a clockwise direction or counterclockwise direction (step S110). If the driving direction is the clockwise direction, it is next determined if the driving step of the stepping motor is an odd number or even number (step S120). If the driving step is an even number, as a step S130, the initial position starts as a position where the time difference protrusion 236 of the lower gear 232a-2 contacts the slide protrusion 240 of the upper gear 232a-1.

Since the time difference protrusion 236 is in a contact state with the time difference protrusion 240, the rotating force of the stepping motor is transmitted to the focus control ring 218, thereby rotating the focus control ring 218 as much as the measured distance amount(4 steps).

At this point, the exposure ring 228 connected to the exposure speed reduction gear 230 receives a clockwise rotating force and moves by 4 steps.

Although the sector open lever 248 receives a clockwise rotating force about the pin 252 while receiving rotating force from the stepping motor M and performing focus control, since the anchor 264 is engaged with the governor gear 262, the protrusions 229' and 231' of the exposure control ring 228 restrains the rotation of the sector open lever 248 before the sectors pivot to the open position. That is, the sectors are prevented from being opened during the focus control time.

This is done by restricting the movement of the sector open lever to the open position since the angular velocity of the exposure control ring 228 is higher than that of the sector open lever 248.

When completing the focus control by the above operation, the stepping motor M rotates counterclockwise by 1 step to enable exposure control while the sector close lever 246 is in a state where it cannot rotate since it contacts the end 235' of the exposure control ring 228 (step S150).

That is, the counterclockwise rotation of the stepping motor M by 1 step rotates the lower gear 232a-1 clockwise by 1 step so that the exposure control ring 228 can rotate counterclockwise by 1 step in a state where the focus control ring 218 does not rotate, thereby releasing the restrain of the sector close lever 246.

At this point, although the sector close lever 246 is maintained in an attached state to the magnet 268, the sector open lever 248 rotates to the open position by the elastic force of the elastic member 256 so as to open the sectors. After completing the exposure as described above, the magnet for exposure control is turned off so that the sector close lever 246 can be closed by the biasing force of the elastic member.

During this operation, the lower gear 232a-2 performs the focus control by being rotated counterclockwise by 4 steps by the stepping motor M in response to the initial measured distance, and then rotates clockwise by 1 step for exposure control. Therefore, the resultant number of rotating steps of the lower gear 232a-2 become 3 steps counterclockwise. In addition, the time difference 236 of the speed reduction gear is displaced toward the right from the initial left position.

That is, in a state where the focus control ring 218 rotates clockwise by 4 steps, even when the lower gear 232a-2 rotates clockwise by 1 step, the focus control ring 218 does not rotate since the time difference protrusion 236 and the slide 240 is in a disengaged state.

Further, the exposure control ring 228 rotates clockwise by 4 steps and then rotates counterclockwise by 1 step for exposure control. Therefore, the resultant number of rotating step of the exposure control ring 228 become 3 steps clockwise.

After completing the exposure operation as described above, an initialization of the shutter starts in accordance with a command of a control process unit (not shown).

The stepping motor rotates clockwise by 1 step to allow for the exposure control ring 228 to freely rotate by rotating the sector close lever 246 counterclockwise (step 160).

At this point, since the time difference protrusion 238 of the lower gear 232a-2 contacts the slide protrusion of the upper gear 232a-1, the focus control ring 218 does not rotate while the exposure control ring 228 rotates clockwise by 1 step. Therefore, from the initial position, each resultant rotation of both the focus control ring 218 and the exposure control ring 228 becomes 4 steps.

In this state, the magnet connected to the sector close lever 246 is turned on (step S170) and thereby the stepping motor rotates counterclockwise by 5 steps so as to return the focus control ring 218 to the initial position. In addition, by the rotation of the stepping motor, the exposure control ring 228 which has been over-run counterclockwise by 1 step rotates clockwise by 1 step to be returned to the initial position, and the time difference protrusion 236 comes to contact the slide protrusion 240, thereby completing the mechanical initialization of the shutter.

Since the exposure control ring 228 is in a state where it is rotated by further 1 step, the stepping motor is rotated in an opposite direction by 1 step so as to return the exposure control ring 228 to the initial position, completing the initialization of the exposure control ring 228 (step S180), and when the magnet is turned off (step S190), the control operation is completed (step S200).

When the focus control ring and the exposure control ring rotate clockwise simultaneously and the stepping motor rotates by 7 steps, a normal exposure method is as follows:

The speed reduction gear 232a rotates counterclockwise by 7 steps (step S130-1) in which the rotation of the focus control ring 218 is the same as that of the exposure control ring 228 and the sector close lever 246 is released from the exposure control ring. At this point, since the magnet 268 restrains the sector close lever 246, the sector close lever does not operate.

Accordingly, the sectors maintain their open state. The sectors are closed when the exposure is completed and the magnet 268 is turned off.

The operation for initializing the sectors after completing the exposure will be described hereinafter. An initialization of the shutter starts in accordance with a command of a control process unit (not shown).

The stepping motor rotates clockwise by 1 step to allow for the exposure control ring 228 to freely rotate by rotating the sector close lever 246 counterclockwise (step S160).

At this point, since the time difference protrusion 238 of the lower gear 232a-2 contacts the slide protrusion of the upper gear 232a-1, both the focus control ring 218 and the exposure control ring 228 rotate clockwise by 1 step. Therefore, from the initial position, each resultant number of rotating steps of both the focus control ring 218 and the exposure control ring 228 becomes 8 steps.

In this state, when the magnet connected to the sector close lever 246 is turned on, thereby the stepping motor rotating to rotate the lower gear 232a-1 clockwise by 9 steps, the focus control ring 218 is returned to the initial position. However, since the exposure control ring 228 is in a state where it is rotated by further 1 step, the stepping motor is rotated in an opposite direction by 1 step so as to return the exposure control ring 228 to the initial position, and at the same time, the time difference protrusion 236 comes to contact the slide protrusion, completing the initialization and turning off the magnet.

When the focus control ring and the exposure control ring rotate counterclockwise and the stepping motor rotates by 4 steps, a normal exposure method is follows:

In step S125, it is determined whether the driving number of the stepping motor M is an even number step or an odd number step.

If the determined number is an even number step, in the step S135, the stepping motor M rotates with the even number step, and in the step S145, the stepping motor rotates clockwise by 1 step.

In the above, since the time difference protrusion 236 of the speed reduction gear 232a contacts the slide protrusion 240, the rotating force is transmitted late to the focus control ring 18 by 1 step, thereby rotating the focus control ring 218 counterclockwise by 3 steps.

In this point, the exposure control ring 228 connected to the reduction gear 230 rotates clockwise by 4 steps while receiving clockwise rotating force.

At this state, to perform the exposure operation, when the lower gear 232a-2 rotates counterclockwise by 1 step, the slide protrusion of the upper gear 232a-1 comes to contact the time difference protrusion 236, such that the focus control ring 218 does not rotate while the exposure control ring 228 rotates clockwise by 1 step to allow the sectors to be capable of an opening state.

At this point, since the magnet 268 is controlled to an on state, the sector close lever 246 is restrained, and the sector open lever 248 rotates by the biasing force of the elastic member 256, thereby opening the sectors.

After completing the exposure operation, the magnet 268 is turned off so that the sector open lever 246 can rotate to the close position by the biasing force of the elastic member 254.

By rotating the stepping motor M clockwise by 1 step, the sector close lever 246 then rotates counterclockwise to make the rotation of the exposure control ring 228 free, thereby starting the initializing operation.

At this point, since the time difference protrusion 236 of the lower gear 232a-2 contacts the slide protrusion 240 of the upper gear 232a-1, both the focus control ring 218 and the exposure control ring 228 rotate clockwise by 1 step. Therefore, each resultant number of rotating steps of the rings 218 and 228 becomes 2 steps from the initial position.

In this state, when the mag net 268 is turned on and the lower gear 232a-2 rotates counterclockwise by 2 steps by rotating the stepping motor, both the focus control ring 218 and the exposure control ring 228 are simultaneously returned to the initial position, and the time difference protrusion 236 comes to contact the slide protrusion 240, thereby completing the initializing operation and turning off the magnet 268.

When both the focus control ring and the exposure control ring rotate counterclockwise and the stepping motor rotates by 7 steps, a normal exposure method is as follows:

In step S125, it is determined whether the driving number of the stepping motor M is an even number step or an odd number step.

If the determined number is the odd number step, in the step S135-1, the stepping motor M rotates by 7 steps.

In the above, since the time difference protrusion 236 of the speed reduction gear 232a contacts the slide protrusion 240, the rotating force is transmitted late to the focus control ring 218 by 1 step, thereby rotating the focus control ring 218 counterclockwise by 6 steps.

As a result, the time difference protrusion 240 comes to contact the time difference protrusion of the lower gear 232a-2, and the sector close lever 246 comes to be in a state where it can rotate.

At this point, since the magnet 268 is controlled to an on state, the sector close lever 246 is restrained, and the sector open lever 248 rotates by the biasing force of the elastic member 256, thereby opening the sectors.

After completing the exposure operation, the magnet 268 is turned off so that the sector open lever 246 can rotate to the close position by the biasing force of the elastic member 254.

By rotating the stepping motor M counterclockwise, the sector close lever 246 then rotates counterclockwise to make the rotation of the exposure control ring 228 free, thereby starting the initializing operation.

That is, in a state where the time difference protrusion 238 of the lower gear 232a-2 contacts the time difference protrusion 240 of the upper gear 232-1, by the 1 step rotation of the stepping motor M, the time difference protrusion 236 comes to contact the slide protrusion 240 and the exposure control ring 228 rotates clockwise by 1 step. Therefore, each resultant number of rotating steps of the focus control ring 218 and the exposure control ring 228 becomes 5 steps.

At this point, by controlling the magnet 268 to an on state and 6 steps rotation of the stepping motor M counterclockwise, both the focus control ring 218 and the exposure control ring 228 are simultaneously returned to the initial position, and the magnet 268 is turned off.

Figure 24:
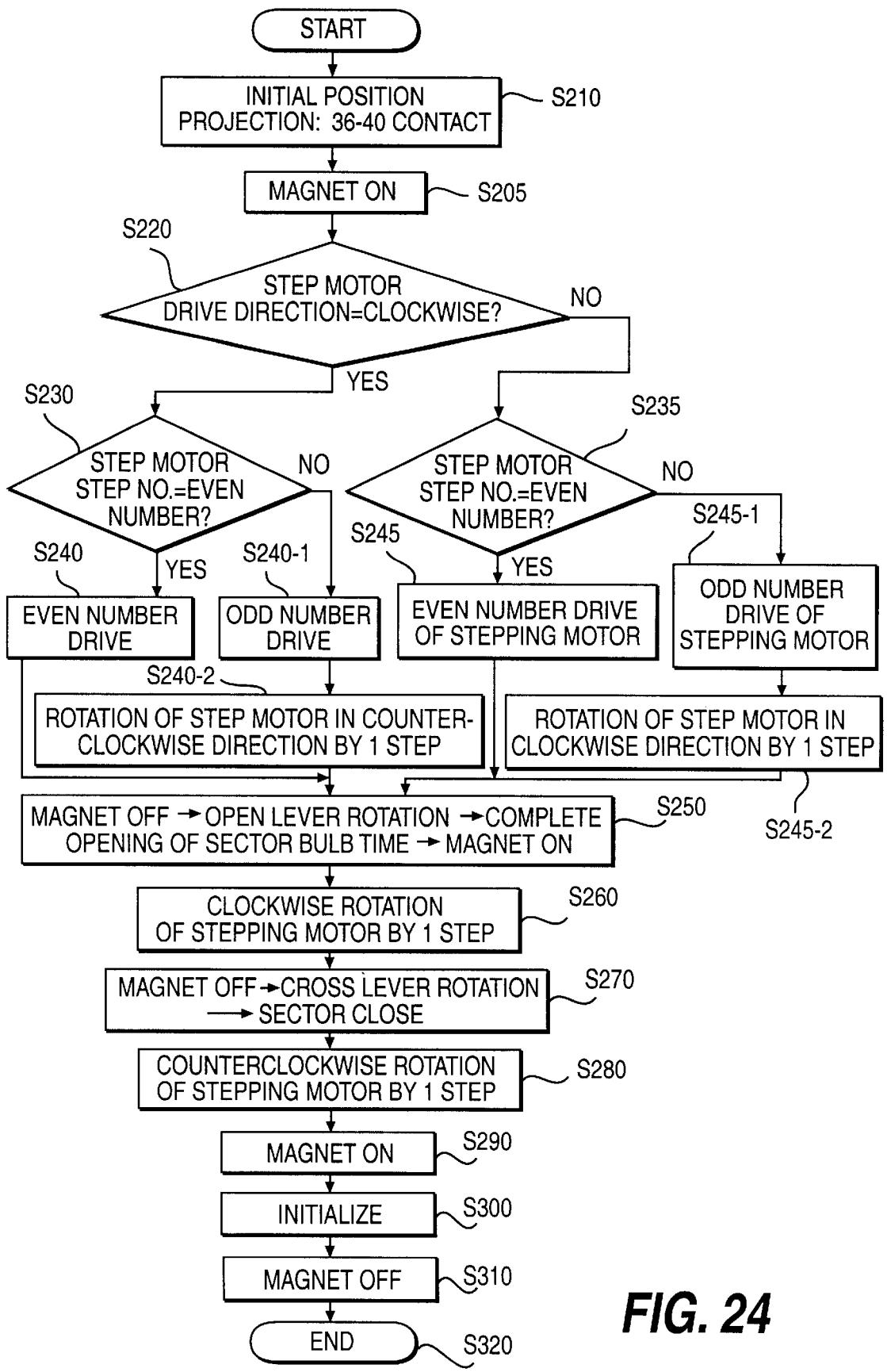
FIG. 24 is a flow chart of bulb exposure for explaining an electronic shutter driving control method according to a second preferred embodiment of the present invention.
Figure 29:
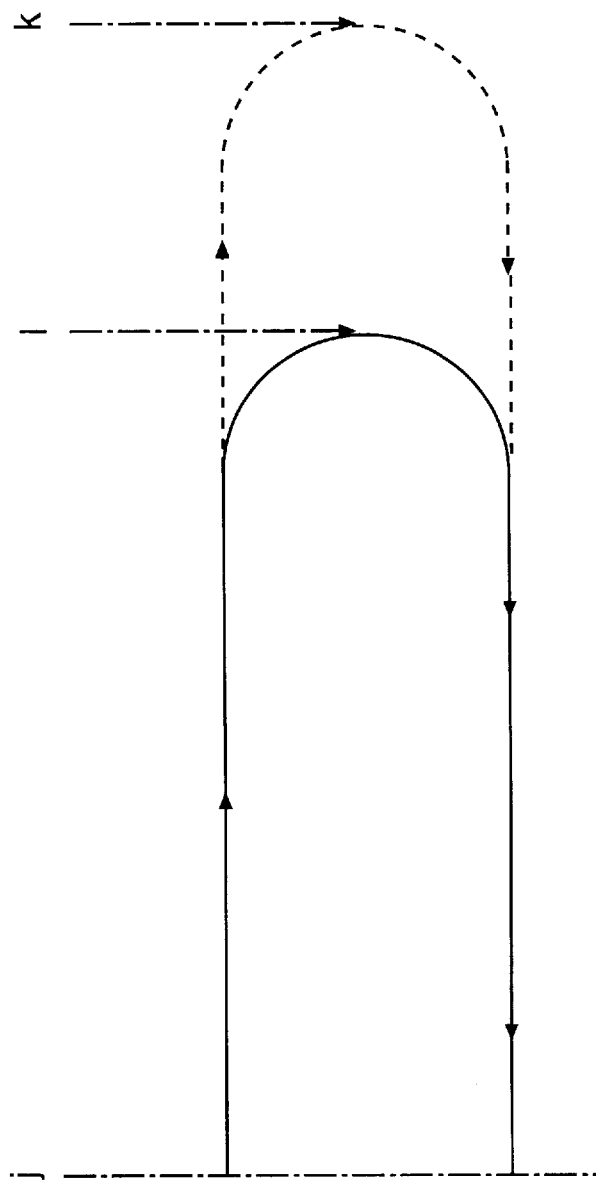
FIG. 29 is a view illustrating a driving sequence of a prior electronic shutter.

A bulb exposure method will be described hereinafter with reference to FIGS. 24, 27 and 28 when the focus control ring and the exposure control ring rotate clockwise and the stepping motor rotates by 4 steps.

Bulb exposure differs from normal exposure in that the magnet 268 for adjusting the sector opening time cannot remain in an on state. Therefore, in a state where the sector close lever 246 is engaged with the end 235' of the exposure control ring 228, after turning off the magnet and exposing as much as the bulb time, the initializing operation starts.

At the initial position, the time difference 36 provided on the lower gear 232a-2 of the speed reduction gear 232a contacts the slide protrusion 240 provided on the upper gear 232a-1 (step S210).

It is determined if the driving direction of the stepping motor M is a clockwise direction or counterclockwise direction (step S220). If the driving direction is in the clockwise direction, it is next determined if the driving step of the stepping motor is an odd number or an even number (step S230).

If it is determined that the driving step rotates clockwise by 4 steps, since the time difference protrusion 236 is in a contact state with the time difference protrusion 240, the rotating force of the stepping motor is transmitted to the focus control ring 218, thereby rotating the focus control ring as much as the measured distance amount (step S240).

At this point, the exposure ring 228 connected to the exposure speed reduction gear 230 receives clockwise rotating force and rotates by 4 steps.

By the above operation, as completing the focus control, the magnet 268 is controlled to an off state to maintain the sectors open state as much as the preset bulb time (step S250).

Therefore, the sector open lever 248 rotates to open the sectors, and in this state, after a predetermined amount of time passes, the magnet 268 is turned off.

To close the sectors, when rotating the stepping motor M clockwise by 1 step after completing bulb exposure for closing the sectors (step S260), the sector close lever 246 comes to be released from the end 235' of the focus control ring 228. At this state, when controlling the magnet 268 to an off state (step S270), the sectors are closed by the biasing force of the elastic member 254 of the sector close lever 246.

And then, for the initializing operation, the lower gear 232a-1 is rotated counterclockwise by 1 step (step S280), and the magnet 268 is turned on (step S290).

By this operation, since the resultant number of rotating steps of the speed reduction gear becomes 6 steps in the clockwise direction, the speed reduction gear should rotate counterclockwise by 6 steps for the initialization.

However, since the slide protrusion 240 of the upper gear 232a-1 contacts the time difference protrusion 236 of the lower gear 232a-2, when rotating counterclockwise by 6 steps, there is an error by 1 step when driving the focus control ring 218.

To compensate for the error, after rotating the lower gear 232a-2 clockwise, which positions the focus control ring 218 to the initial position by rotating it counterclockwise by 6 steps, when rotating the reduction gear 232a counterclockwise by 1 step to return both the speed reduction gear 232a and the exposure control ring 228 to the initial position, the time difference protrusion 236 and the slide protrusion 240 is displaced to the initial position and thereby the exposure control ring 228 is also returned to the initial position (step S300).

In this state, the electric power which has been applied to the magnet 268 is turned off, thereby completing the exposure control (step S310).

When the focus control ring and the exposure control ring rotate clockwise and the stepping motor rotates by 7 steps, a bulb exposure method is as follows.

At the initial position where the time difference 236 provided on the lower gear 232a-2 of the speed reduction gear 232a contacts the slide protrusion 240 provided on the upper gear 232a-1, if it is determined that the driving step of the stepping motor M is clockwise 7 steps (step S240-1), the lower gear 232a-2 rotates counterclockwise by 7 steps, and the both the focus control ring 218 and the exposure control ring 228 rotate clockwise by 7 steps.

For bulb exposure, the focus control ring 218 does not rotate and the reduction gear 232a rotates clockwise by 1 step such that the sector close lever 246 can be engaged with the end 235' of the exposure control ring 228.

By this operation, the focus control ring 218 does not rotate, and the exposure control ring 228 rotates counterclockwise by 1 step such that the sectors can open and the time difference protrusion 238 comes to contact the slide protrusion 240.

In this state, to maintain the sector opening time as much as the predetermined bulb time, when turning the magnet 268 off, the sector open lever 248 rotates to completely open the sectors.

At this point, since the sector close lever 246 cannot moved by being engaged with the end 235' of the exposure control ring 228, the bulb exposure is realized.

Since this state is that the exposure control ring further rotates counterclockwise by 1 step, the resultant rotation becomes 6 steps and the time difference protrusion 238 comes to contact the slide protrusion 240.

After completing bulb exposure, the magnet 268 is controlled to an on state. At this state, to close the sectors, the lower gear 232a-2 further rotates counterclockwise by 1 step so that the sector close lever 246 can be disengaged with the end 235' of the exposure control ring 228. When the magnet 268 is then turned off, the sector close lever rotates to close the sectors.

It this state, when rotating the lower gear 232a-2 counterclockwise by 1 step and turning the magnet 268 on, the resultant rotation of the lower gear 232a-2 becomes 8 steps.

Here, by rotating the speed reduction gear 232a clockwise by 8 steps, initialization is realized.

However, when the speed reduction gear rotates clockwise in a state where the time difference protrusion 236 of the speed reduction gear 232a contacts the slide protrusion 240, an error occurs by 1 step when driving the focus control ring 218. To compensate the error, after rotating the lower gear 232a-2 clockwise by 9 steps and returning the focus control ring 218 to the initial position, when rotating the lower gear 232a-2 counterclockwise by 1 step to return both the speed reduction gear 232a and the exposure control ring 228 to the initial position (step S300), the time difference protrusion 236 rotates to the initial position where it contacts the slide protrusion 240, and the exposure control ring 228 is also returned to the initial position.

When the focus control ring and the exposure control ring rotate counterclockwise and the stepping motor rotates by 4 steps, a bulb exposure method will be described hereinafter.

If the driving direction is the counterclockwise direction (step S220), it is next determined if the driving step of the stepping motor is an odd number or an even number (step S230).

If it is determined that the driving step is counterclockwise 4 steps (step S245), since the 4-step clockwise rotation of the lower gear 232a-2 rotates the upper gear 232a-2 and the time difference protrusion 240 after their 1-step rotation, the focus control ring 218 rotates counterclockwise by 3 steps.

Since the time difference protrusion 238 is in a contact state with the slide protrusion 240, to maintain the predetermined sector opening time as much as the pre-set bulb open time, when turning the magnet 268 off, the sector open lever 248 rotates to completely open the sectors. This open state is maintained for as long as the bulb time.

In a state where the magnet 268 is turned on, when rotating the lower gear 232a-2 counterclockwise by 1 step to release the exposure control ring 228 from the sector close lever 246 and when turning the magnet 268 off, the sector close lever 246 pushes the sector open lever 248, thereby closing the sectors and completing the bulb photographing.

At this state, the initialization starts by turning the magnet 268 on after rotating the lower gear 232a-2 counterclockwise.

By this control, the resultant rotation of the lower gear 232a-2 becomes clockwise 2 steps.

When the focus control ring and the exposure control ring rotate counterclockwise and the stepping motor rotates by 7 steps, a bulb exposure method is as follows.

In step S235', it is determined that the driving step of stepping motor M is an odd number (7 steps), from the initial position where the time difference protrusion 236 of the speed reduction gear 232a contacts the slide protrusion 240, the focus control ring 218 rotates after 1 step of the motor. Accordingly, the resultant number of rotating steps of the focus control ring 218 becomes 6 steps.

At this point, since the exposure control ring 228 rotates counterclockwise by 7 steps, for bulb exposure, the exposure control ring 228 rotates clockwise by 1 step in a state where the focus control ring 218 does not rotate, such that the sector close lever 246 can be engaged with the end 235' of the exposure control ring 228.

By this operation, the lower gear 232a-2 comes to rotate by 1 step, and the time difference protrusion 238 comes to contact the slide protrusion 240.

After this, to maintain the sector opening time as much as the pre-set bulb time, the magnet 268 is turned off and the sector open lever 248 rotates, thereby completely the opening of the sector open lever 248.

After opening the bulb for a predetermined time, the magnet 268 is turned on, the lower gear 232a-2 rotates counterclockwise by 1 step to release the sector close lever 246 from the end 235' of the exposure control ring 228, and the magnet 268 is turned off again.

By this operation, since the sectors are closed while the sector close lever 246 rotates, bulb exposure is completed.

In this state, initialization starts by controlling the magnet 268 to an on state after the speed reduction gear 232a rotates counterclockwise by 1 step.

At this point, the speed reduction gear 232a rotates clockwise by 7 steps for the focus control, counterclockwise by 1 step to maintain the sectors in a bulb state, counterclockwise by 1 step to close the sectors, and counterclockwise by 1 step for initialization. Therefore, the resultant rotation of the speed reduction gear 232a becomes 4 steps from the initial position.

The focus control ring 218 rotates by the speed reduction gear 232a counterclockwise by 6 steps, rotates clockwise by 1 step to close the sectors, and rotates clockwise by 1 step for initialization. Therefore, the resultant rotation of the focus control ring becomes 4 steps.

The exposure control ring 228 rotates counterclockwise by 7 steps for the focus control, clockwise by 1 step for exposure, clockwise by 1 step to close the sectors, and counterclockwise by 1 step for initialization. Therefore, the resultant number of rotating steps of the exposure control ring 228 becomes 4 steps.

At this point, since the time difference protrusion 236 of the speed reduction gear 232a contacts the slide protrusion 240, for the initialization, the stepping motor M rotates clockwise by 4 steps to rotate the lower gear 232a-2 counterclockwise by 4 steps, completing initialization. Finally, the magnet 268 is controlled to an off state.

What is claimed is:

1. A method for driving an electronic shutter of a camera, comprising the stages of:

setting an initial focus of a rotating member co-axial and connected with a focus control lens in a state where said focus control lens is pre-set in a middle position between a maximum position and a minimum position of a whole focusing region, such that the initial position of a focus control lens is positioned in a middle step between a focus position of said focus control lens with respect to a pre-set farthest subject and a focus position of said focus control lens with respect to closest subject;

controlling focus by rotating the rotating member connected to a first driving means in a clockwise or counterclockwise direction from an initial position, in order to move said focus control lens to a focused position set according to a value calculated by a distance measuring means when a shutter switch is operated; and performing exposure by operating sector opening/closing means according to an exposure value calculated by a luminescent measuring means, and connecting sectors, which are biased through an elastic member, with second driving means rotating in either direction, depending on the application of current, when controlling focus of said focus control lens is finished.

2. A method for driving an electronic shutter of a camera in which a focus control lens moves to a focus position and is connected to an exposure control ring to perform an opening and/or closing of sectors, comprising the stages of:

setting an initial position so that a focus control ring is located at a pre-set initial position by determining the position of said focus control ring co-axial with and connected to said focus control lens by the use of an initial position detecting/adjusting means, in a state where said focus control lens is disposed in a middle position between a focus position said focus control lens with respect to a pre-set farthest subject and a focus position of said focus control lens with respect to a pre-set closest subject, wherein said positions are separated by distance increments defined as steps, such that the initial position of said focus control lens is positioned in a middle step among all the steps of focus control position;

adjusting focus position, multi-step zooming said focus control lens toward sectors or subjects by rotating the focus control ring clockwise or counterclockwise when viewed from the position of the subject, the focus control ring including a speed reduction gear and rotating in the same direction as that of an applied power source to move said focus control lens; and performing exposure according to an exposure value calculated by a luminescent measuring means by opening sectors, which are biased in a closed state through an elastic member, by an automatic exposure meter overcoming the biasing force, wherein the automatic exposure meter rotates in a certain direction according to the application of current, and by closing said sectors by the returning force of the elastic member according to the application of a reversed current to said automatic exposure meter.

3. A method for driving an electronic shutter of a camera according to claim 2, wherein the power source of a first driving means rotates by 90 degrees per one-step of driving.

4. A method for driving an electronic shutter of a camera according to claim 2 or 3, wherein a stabilized region of a stepping motor is set while applying a power supply to an automatic exposure meter at a point that adjustment of the focus position is finished by stopping of the focus control ring.

5. A method for driving an electronic shutter of a camera according to claim 4, wherein said stabilized region of the stepping motor is set by at least 20 ms.

6. A method for driving an electronic shutter of a camera according to claim 2, wherein the initial position of the focus control ring is set by a photo interrupter which detects the changed position of said focus control ring, and rotates said focus control ring in a close direction to the initial position by driving said power source.

7. A method for driving an electronic shutter of a camera according to claim 2, wherein said focus control lens is zoomed toward sectors or the subject by a linear moving lens holder meshed with said focus control ring and slideable relative to said focus control ring, the rotation of the lens holder being interrupted by a motor cover member when said focus control ring rotates in a clockwise or counterclockwise direction to move said lens holder.

8. A method for driving an electronic shutter of a camera according to claim 2 or 7, wherein a lens barrel integrally combined with the lens holder is elastically supported to be biased always toward the subject, including an elastic member in order to remove a gap error which occurs in a combination of teeth of the focus control ring and lens holder.

9. A method for driving an electronic shutter of a camera according to claim 2, wherein the automatic exposure meter rotates in one direction, overcoming the biasing force, and rotates a sector lever having teeth when electric power is applied, such that sectors connected with the sector lever thereof are opened.

10. A method for driving an electronic shutter of a camera according to claim 2, wherein slots of sectors opened by the automatic exposure meter measure corresponding slots formed in a shutter base through a photo reflector, and sets a starting point, to control an exposure value calculated by the luminescent measuring means.

11. A system for driving an electronic shutter of a camera, comprising:

a first driving means including a power supply;

a rotation member meshing with said driving means, co-axial and connected to a focus control lens, rotating in the same direction as the power supply, and zooming the focus control lens in response to a value calculated by a distance measuring means;

means for detecting and adjusting an initial position of the rotation member which adjusts said rotation member to a set initial position when said rotation member is not positioned in a middle position between a maximum zooming position and a minimum zooming position when initial power supply is applied to the camera; and second driving means for opening/closing sectors which are driven according to an exposure value calculated by a luminescent measuring means when a power supply is applied, while keeping sectors closed, biased by an elastic member.

12. A system for driving an electronic shutter of a camera, having means for setting an initial position for a focus control lens at a position between a focus position of said focus control lens regarding a pre-set farthest subject and a focus position of said focus lens regarding a pre-set closest subject, said system comprising:

a power supply;

a reduction gear portion meshing with said power supply, and transmitting a rotating effect thereof;

a focus control ring co-axial and connected with the focus control lens, meshing with said reduction gear portion, rotating in the same direction as said power supply, and zooming a lens holder integrally combined with a lens barrel with the rotating effect to a position determined by a calculation value calculated by distance measuring means;

a photo interrupter for detecting a changed position of the focus control ring, and for returning said focus control ring to an initial position by operating the power supply;

an automatic exposure meter which is biased toward one direction by an elastic member, and which is rotated or returned in the opposite direction to overcome the biasing force of said elastic member; and a sector lever, connecting with the rotation of said automatic exposure meter, and opening/closing sectors.

13. A system for driving an electronic shutter of a camera according to claim 12, wherein the lens holder is threadingly connected with the inner circumferential surface of the focus control ring.

14. A system for driving an electronic shutter of a camera according to claim 12, wherein a rotation-preventing lug formed on the outer circumferential surface of the lens holder moves slidably within a rotation-preventing groove formed on the motor cover.

15. A system for driving an electronic shutter of a camera according to claim 12 or 14, including an elastic member for elastically supporting the lens barrel on the motor cover.

16. A method for driving an electronic shutter of a camera, including a focus control lens for controlling focus, comprising the stages of:

setting an initial position for the focus control lens at a position between a focus position of said focus control lens regarding a pre-set farthest subject and a focus position of said focus control lens regarding a pre-set closest subject;

controlling focus by rotating said focus control ring, co-axial with said focus control lens and connected with driving means, in one direction or an opposite direction to move said focus control ring to a pre-set position determined according to a calculation value calculated by a distance measuring means when a shutter switch is operated; and performing exposure according to an exposure value calculated by a luminescent measuring means by operating sector opening/closing means, stopping the exposure control ring, which is rotated in the same direction as the focus control ring by a driving means, with the focus control ring at a locking-released position of the sector opening/closing means when controlling the focus of said focus control lens is completed.

17. A method for driving an electronic shutter of a camera, in which the focus control lens connected with the focus control ring moves to a focus position, and opening/closing of sectors is performed by connection of an exposure control ring, comprising the stages of:

setting an initial position of said focus control ring which drives said focus control lens, disposing said focus control lens at a middle position between a focus position of said focus control lens regarding a pre-set farthest subject and a focus position of said focus control lens regarding a pre-set closest subject, wherein said positions are separated by distance increments defined as steps, such that the initial position of zooming for said focus control lens is positioned in a middle step among all the steps;

adjusting the focus position, multi-staged moving said focus control lens toward sectors or a subject by rotating said focus control ring in one direction or an opposite direction to perform focus control for said focus control lens, said direction of rotation dependent on a calculation value calculated by a distance measuring means when the shutter switch is operated;

performing exposure by:

a) starting an exposure operation by positioning the exposure control ring, which is rotated and includes projections and grooves alternatingly spaced along its outer circumference with projection ends formed on the projections to lock a sector closing lever, such that a sector opening lever can be disposed on the projections, and b) closing and opening the sectors in response to an exposure value calculated by a luminescent measuring means by stopping the exposure control ring and the focus control ring at a point where the exposure control ring rotates one step in an opposite direction when the sector closing lever is engaged by the projection end of the projection; and initializing the system, returning said focus control ring and said exposure control ring to a point that said sector closing lever is biased on the projection end of the projection of the exposure control ring after the exposure has been performed such that said exposure control ring is again rotated by one step in the opposite direction.

18. A method for driving an electronic shutter of a camera according to claim 17, wherein said focus control ring stops after one step, and rotates, when the direction of driving means is reversed.

19. A method for driving an electronic shutter of a camera according to claim 17 or 18, wherein the initial position is set such that the focus control ring is directly connected during clockwise rotation of the driving means, and is stopped by one step in the counterclockwise direction.

20. A method for driving an electronic shutter of a camera according to claim 17, wherein a power supply of a driving means rotates 90 degrees for every driving step.

21. A method for driving an electronic shutter of a camera according to claim 17, wherein the sector opening lever as a component of the sector opening/closing means is biased on a projection end formed on the outer circumferential surface of said focus control ring at an initial position of said focus control ring such that movement error of sectors caused by outer shocks is prevented.

22. A method for driving an electronic shutter of a camera according to claim 21, wherein said focus control lens maintains the initial position despite rotation of said focus control ring in a region that the projection end of the focus control ring biases the sector opening lever.

23. A method for driving an electronic shutter of a camera according to claim 21, wherein the sector opening lever rotates in a direction to open the sectors when its engaged state is released by the projection said focus control ring which rotates slower than the rotation speed of one step of said exposure control ring by speed control means, moving along the outer circumferential surface of the grooves and projections of said exposure control ring.

24. A method for driving an electronic shutter of a camera according to claim 17, wherein said sector closing lever of the sector opening/closing means is biased by an exposure control magnet, said magnet being turned on when a shutter switch is operated, and closing the sectors at a time determined according to an exposure value calculated by the luminescent measuring means.

25. A method for driving an electronic shutter of a camera according to claim 17 or 24, wherein, after automatic exposure is performed, said exposure control ring magnet is turned on when said sector closing lever is biased on a projection end of a projection of said exposure control ring by one step in a clockwise direction of said exposure control ring, and said exposure control ring magnet is turned off when said exposure control ring is returned to the initial position.

26. A method for driving an electronic shutter of a camera according to claims 17, 23, or 24, wherein the sector opening lever stops after said focus control ring performs focus control, and opens sectors by rotating a sector drive pin clockwise according to the stopping of said exposure control ring when said sector closing lever is positioned on the projection of said exposure control ring, and said exposure control magnet is engaged by said sector closing lever.

27. A method for driving an electronic shutter of a camera according to claim 17, including rotating said exposure control ring again by one step in the opposite direction to an initialized direction at the point that automatic exposure is performed, and initializing the focus control ring by returning to the opposite direction, so as to be directly connected during the clockwise rotation of the power supply constituting driving means to set the initial position.

28. A method for driving an electronic shutter of a camera according to claim 17, wherein exposure is performed according to an exposure value calculated by luminescent measuring means, and includes stopping the exposure control ring with said focus control ring when the sector opening/closing means are disposed on projection release locking, and rotating the sector opening/closing means by one step in the opposite direction when engaged by the projection end of said projection, to perform automatic exposure according to an exposure value incident from the subject, in a state that adjustment for the focus position is performed.

29. A method for driving an electronic shutter of a camera according to claim 17, 23, or 24, including performing bulb exposure by closing sectors with the rotating effect of said sector closing lever when said sector closing lever is positioned on the groove of the exposure control ring with one step clockwise rotation of said exposure control ring, totally opening sectors by clockwise rotation of said sector opening lever, stopping said exposure control ring with the focus control ring in a state that, after adjustment for the focus position is performed, said closing lever is biased on the projection end of a projection of said exposure control ring and said exposure control ring is biased on the projection end of the projection with a one step further rotation in the opposite direction when said sector closing lever is not positioned on the projection end of the projection of said exposure control ring.

30. A method for driving an electronic shutter of a camera according to claim 29, including engaging the sector closing lever by said exposure control magnet being turned on when a shutter switch is operated, and said sector closing lever turning said exposure control ring magnet off when it is biased on the projection end of projection of said exposure control ring such that sectors are totally opened.

31. A system for diving an electronic shutter of a camera, comprising, driving means including a power supply and means for transmitting the rotating effect thereof;

a focus control ring for zooming an exposure control lens to a position determined by a calculation value calculated by a distance measuring means according to the rotating effect, said ring rotating in the same direction as the power supply meshed with said driving means, and rotating, after stopping, for one step when the rotation direction of said power supply is reversed;

an exposure control ring rotating in the same direction as said power supply meshed with said driving means; and sector opening/closing means for opening/closing sectors according to an exposure value calculated by a luminescent measuring means, and releasing locking by stopping the rotating action of both said focus and exposure control rings.

32. A system for driving an electronic shutter of a camera, in which a lens connected with the focus control ring moves to a focus position, and opening/closing of sectors is performed in connection with an exposure control ring, comprising:

reduction means rotating after stopping for one step, when the rotation direction of said power supply is reversed, while transmitting the rotating effect meshed with the power supply;

a focus control ring for zooming an exposure control lens to a position determined by a calculation value calculated by a distance measuring means with the rotating effect, said ring rotating in the same direction as said power supply meshed with a gear of said reduction means;

an exposure control ring rotating in the same direction as said power supply, being engaged with a gear included between said power supply and said exposure control ring;

a sector opening lever for opening sectors, depending on the stopping of the rotation action of said exposure control ring with the focus control ring; and a sector closing lever for closing sectors, depending on power of an exposure control magnet being turned off at time determined by an exposure value calculated by a luminescent measuring means, and the release of locking by said exposure control ring.

33. A system for driving an electronic shutter of a camera according to claim 21, wherein the focus control ring consists of a projection end of the projection of said focus control ring for biasing said sector opening lever to prevent movement error of sectors caused by outer shocks.

34. A system for driving an electronic shutter of a camera according to claim 33, wherein one end of the sector opening lever includes said sector driving pin, while the other end is meshed with the governor gear and is speed-controlled by an anchor.

35. A system for driving an electronic shutter of a camera according to claim 31, further comprising an elastic member having a circumferential biasing force and a vertical biasing force to prevent double opening of sectors.

* * * * *